US010725624B2

(12) United States Patent
Klaver

(10) Patent No.: US 10,725,624 B2
(45) Date of Patent: *Jul. 28, 2020

(54) MOVEMENT BETWEEN MULTIPLE VIEWS

(71) Applicant: Apple Inc., Cupertino, CA (US)

(72) Inventor: Tom E. Klaver, Mountain View, CA (US)

(73) Assignee: Apple Inc., Cupertino, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 16/147,418

(22) Filed: Sep. 28, 2018

(65) Prior Publication Data

US 2019/0034053 A1    Jan. 31, 2019

Related U.S. Application Data

(63) Continuation of application No. 14/868,150, filed on Sep. 28, 2015, now Pat. No. 10,101,882.

(Continued)

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/04845* (2013.01);
(Continued)

(58) Field of Classification Search
CPC .. G06F 3/04883; G06F 3/0488; G06F 3/0482; G06F 3/0416; G06F 2203/04808;
(Continued)

(56) References Cited

U.S. PATENT DOCUMENTS 5,463,725 A   10/1995 Henckel et al.
6,337,698 B1   1/2002 Keely, Jr. et al.
(Continued)

FOREIGN PATENT DOCUMENTS

CN    1475962 A    2/2004
CN    101315593 A   12/2008
(Continued)

OTHER PUBLICATIONS

International Preliminary Report on Patentability received for PCT Application No. PCT/US2015/053144, dated Dec. 14, 2017, 8 pages.

(Continued)

*Primary Examiner* — Di Xiao
(74) *Attorney, Agent, or Firm* — Dentons US LLP

(57) ABSTRACT

The present aspects relate to swift movement between multiple pages or views. Electronic devices may be limited in readily moving between two or more pages or views within an application process. For example, to move between multiple pages or views, an electronic device may receive a single input for movement between one page or view and another page or view. However, the present aspects enable an electronic device to move between two or more pages in response to receiving a single input representing, for instance, a contact on a touch-sensitive surface of the electronic device.

27 Claims, 19 Drawing Sheets

Related U.S. Application Data

(60) Provisional application No. 62/171,932, filed on Jun. 5, 2015.

(51) Int. Cl.
  *G06F 3/0488* (2013.01)
  *G06F 3/0482* (2013.01)
  *G06F 3/0484* (2013.01)

(52) U.S. Cl.
  CPC ...... *G06F 3/04883* (2013.01); *G06F 3/04886* (2013.01); *G06F 2203/04803* (2013.01)

(58) Field of Classification Search
  CPC .. G06F 3/04842; G06F 3/0483; G06F 3/0485; G06F 3/04817; G06F 3/0481; G06F 3/016; G06F 3/0414; G06F 3/0412; G06F 2203/04806; G06F 3/0486; G06F 2203/04104; G06F 2203/04105; G06F 3/0484; G06F 3/04847; G06F 3/017; G06F 3/04886; G06F 3/044; G06F 3/04815; G06F 3/0304; G06F 3/03547; G06F 3/04812; G06F 3/04845; G06F 2203/0339; G06F 2203/04803; G06F 2203/04805; G06F 1/1692; G06F 2203/04101; G06F 2203/04108; G06F 2203/04802; G06F 3/0346; G06F 3/045; G06F 9/4443; G06F 1/1643; G06F 1/32; G06F 21/32; G06F 21/36; G06F 3/00; G06F 3/005; G06F 3/048; G06F 3/0487; G06F 3/1423; G06F 3/147; G06F 17/21; G06F 17/211; G06F 17/246; G06F 17/30528; G06F 17/30554; G06F 17/30643; G06F 17/30867; G06F 1/1626; G06F 1/1677; G06F 2200/1634; G06F 2203/014; G06F 3/01; G06F 3/011; G06F 3/033; G06F 3/03545; G06F 3/038; G06F 3/043; G06F 3/04855; G06F 3/165; G06F 8/34; G06F 8/38
  See application file for complete search history.

(56) References Cited

U.S. PATENT DOCUMENTS

| | | |
|---|---|---|
| 6,788,292 B1 | 9/2004 | Nako et al. |
| 2004/0026605 A1 | 2/2004 | Lee et al. |
| 2007/0150842 A1 | 6/2007 | Chaudhri et al. |
| 2008/0040692 A1 | 2/2008 | Sunday et al. |
| 2008/0055257 A1 | 3/2008 | Peng |
| 2008/0211785 A1 | 9/2008 | Hotelling |
| 2008/0278455 A1 | 11/2008 | Atkins et al. |
| 2009/0158149 A1 | 6/2009 | Ko |
| 2010/0013780 A1 | 1/2010 | Ikeda et al. |
| 2010/0013782 A1 | 1/2010 | Liu et al. |
| 2010/0175018 A1 | 7/2010 | Petschnigg et al. |
| 2011/0050594 A1 | 3/2011 | Kim et al. |
| 2012/0192118 A1 | 7/2012 | Migos et al. |
| 2013/0120298 A1 | 5/2013 | Zhou |
| 2013/0326425 A1 | 12/2013 | Forstall et al. |
| 2014/0089829 A1 | 3/2014 | Han et al. |
| 2015/0089450 A1* | 3/2015 | Nurmi ............... G06F 3/0485 715/833 |
| 2015/0355796 A1* | 12/2015 | Iwasaki .............. G06F 3/0488 715/776 |
| 2016/0062614 A1 | 3/2016 | Lou et al. |
| 2016/0253086 A1 | 9/2016 | Jiang et al. |
| 2016/0357375 A1 | 12/2016 | Klaver |

FOREIGN PATENT DOCUMENTS

| | | |
|---|---|---|
| EP | 1058181 A1 | 12/2000 |
| KR | 10-2004-0015427 A | 2/2004 |
| WO | 2006/020305 A2 | 2/2006 |

OTHER PUBLICATIONS

International Search Report and Written Opinion received for PCT Patent Application No. PCT/US2015/053144, dated Feb. 17, 2016, 11 pages.
Non-Final Office Action received for U.S. Appl. No. 14/868,150, dated Oct. 5, 2017, 50 pages.
Notice of Allowance received for U.S. Appl. No. 14/868,150, dated May 10, 2018, 5 pages.
Notice of Allowance received for U.S. Appl. No. 14/868,150, dated Sep. 12, 2018, 3 pages.
Final Office Action received for U.S. Appl. No. 12/788,279, dated Apr. 9, 2013, 15 pages.
Final Office Action received for U.S. Appl. No. 12/788,279, dated Jul. 10, 2014, 16 pages.
International Preliminary Report on Patentability received for PCT Patent Application No. PCT/US2010/062319, dated Jul. 19, 2012, 11 pages.
International Search Report and Written Opinion received for PCT Patent Application No. PCT/US2010/062319, dated May 11, 2011, 12 pages.
Non Final Office Action received for U.S. Appl. No. 12/788,279, dated Feb. 12, 2014, 16 pages.
Non-Final Office Action received for U.S. Appl. No. 12/788,279, dated Sep. 27, 2012, 19 pages.
Notice of Allowance received for Australian Patent Application No. 2015201237, dated Mar. 2, 2017, 3 pages.
Notice of Allowance received for Korean Patent Application No. 10-2012-7020511, dated Dec. 23, 2015, 3 pages (1 page English Translation and 2 pages of Official Copy).
Office Action received for Australian Patent Application No. 2010339638, dated Jun. 14, 2013, 4 pages.
Office Action received for Australian Patent Application No. 2010339638, dated Jun. 26, 2014, 4 pages.
Office Action received for Australian Patent Application No. 2015201237, dated Mar. 4, 2016, 3 pages.
Office Action received for Chinese Patent Application No. 201080063737.8, dated Apr. 18, 2014, 16 pages (8 pages of English Translation and 8 pages of Official Copy).
Office Action received for Chinese Patent Application No. 201080063737.8, dated Dec. 11, 2014, 9 pages (4 pages of English Translation and 5 pages of Official Copy).
Office Action received for Chinese Patent Application No. 201080063737.8, dated Jul. 23, 2015, 9 pages (4 pages of English Translation and 5 pages of Official Copy).
Office Action received for Chinese Patent Application No. 201080063737.8, dated Mar. 29, 2016, 11 pages (6 pages of English Translation and 5 pages of Official Copy).
Office Action received for Chinese Patent Application No. 201080063737.8, dated Oct. 20, 2016, 8 pages (2 pages of English translation and 6 pages of Official Copy).
Office Action received for European Patent Application No. 10799261.2 dated Feb. 13, 2014, 10 pages.
Office Action received for European Patent Application No. 10799261.2 dated Mar. 27, 2017, 31 pages.
Office Action received for Korean Patent Application No. 10-2012-7020511, dated Feb. 25, 2015, 4 pages (1 page of English Translation & 3 pages of Official Copy).
Office Action received for Korean Patent Application No. 10-2012-7020511, dated Jul. 28, 2014, 7 pages (3 pages of English translation and 4 pages of Official copy).
Roth et al., "Bezel Swipe: Conflict-Free Scrolling and Multiple Selection on Mobile Touch Screen Devices", Proceedings of the 27th International conference on Human Factors in Computing Systems, Boston, MA, CHI 2009, Apr. 4-9, 2009, pp. 1523-1526.

(56) References Cited

OTHER PUBLICATIONS

Summons to Attend Oral Proceedings received for European Patent Application No. 107992612, dated Jul. 12, 2016, 12 pages.

* cited by examiner

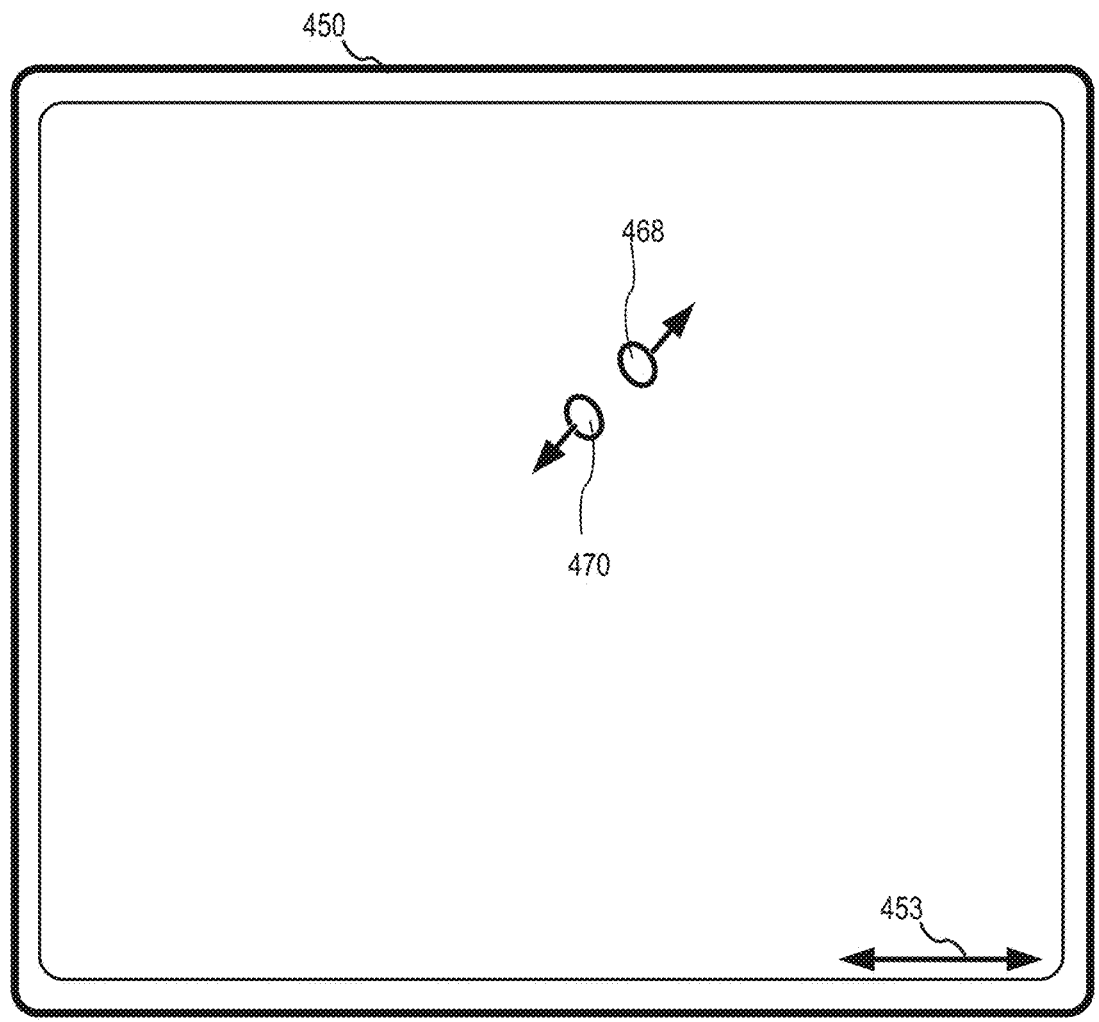
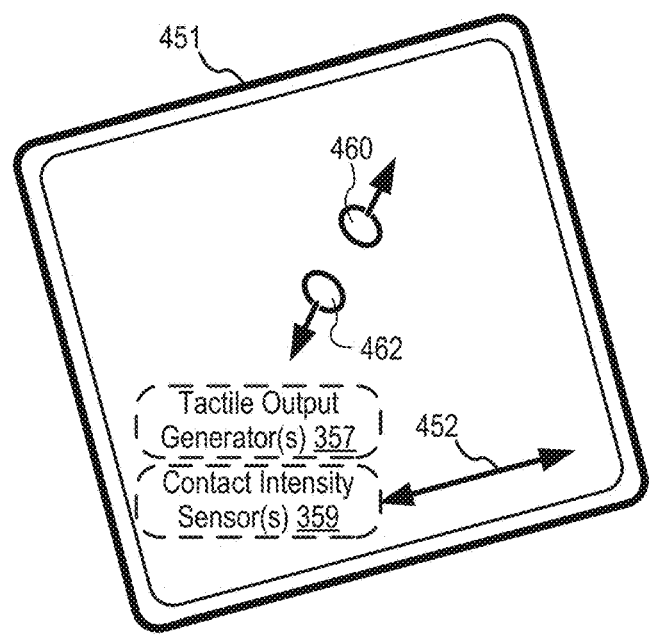
*FIG. 4B*

700

702
DISPLAY, ON THE DISPLAY, A FIRST VIEW IN A SEQUENCE OF VIEWS

704
WHILE DISPLAYING THE FIRST VIEW, RECEIVE AN INPUT CORRESPONDING TO A MOVEMENT OF A CONTACT ON THE TOUCH-SENSITIVE SURFACE FROM A FIRST POSITION TO A SECOND POSITION

706
WHILE CONTINUING TO DETECT THE CONTACT ON THE TOUCH-SENSITIVE SURFACE, AND IN RESPONSE TO RECEIVING THE INPUT, PREPARE TO PERFORM A VIEW NAVIGATION OPERATION

708
DETERMINE WHETHER THE MOVEMENT OF THE CONTACT MEETS SINGLE-VIEW NAVIGATION CRITERIA OR MULTI-VIEW NAVIGATION CRITERIA

710
IN ACCORDANCE WITH A DETERMINATION THAT THE MOVEMENT OF THE CONTACT MEETS SINGLE-VIEW NAVIGATION CRITERIA, THE VIEW NAVIGATION OPERATION INCLUDES NAVIGATING FROM THE FIRST VIEW TO A SECOND VIEW THAT IS ADJACENT TO THE FIRST VIEW IN THE SEQUENCE OF VIEWS

712
IN ACCORDANCE WITH A DETERMINATION THAT THE MOVEMENT OF THE CONTACT MEETS MULTI-VIEW NAVIGATION CRITERIA, THE VIEW NAVIGATION OPERATION INCLUDES NAVIGATING FROM THE FIRST VIEW TO A THIRD VIEW THAT IS SEPARATED FROM THE FIRST VIEW BY ONE OR MORE VIEWS IN THE SEQUENCE OF VIEWS

*FIG. 7*

MOVEMENT BETWEEN MULTIPLE VIEWS

CROSS-REFERENCE TO RELATED APPLICATIONS

This application is a continuation of U.S. patent application Ser. No. 14/868,150, entitled "MOVEMENT BETWEEN MULTIPLE VIEWS," filed Sep. 28, 2015, which claims priority to U.S. Provisional Patent Application No. 62/171,932, entitled "MOVEMENT BETWEEN MULTIPLE VIEWS," filed Jun. 5, 2015, the contents of which are hereby incorporated by reference in their entireties.

FIELD

The present disclosure relates generally to computer user interfaces, and more specifically to techniques for movement between multiple views.

BACKGROUND

Electronic devices may display content of an application process in multiple pages or views. As such, electronic devices may display each page as a user moves from one page or view to another, for example, to view various forms of the content. However, electronic devices may be limited in moving readily between multiple pages or views.

BRIEF SUMMARY

Some techniques for movement between multiple views using electronic devices, however, are generally cumbersome and inefficient. For example, existing techniques may use a complex and time-consuming user interface, which may include multiple contact inputs, key presses or keystrokes. Existing techniques require more time than necessary, detracting from the user's experience, and wasting user time and device energy. This latter consideration may be particularly important in battery-operated devices.

Accordingly, the present embodiments provide for electronic devices with faster, more efficient methods and interfaces for movement between multiple views. Such methods and interfaces optionally complement or replace other methods for movement between multiple views. Such methods and interfaces reduce the cognitive burden on a user and produce a more efficient human-machine interface. For battery-operated computing devices, such methods and interfaces conserve power and increase the time between battery charges.

The present embodiments provide for methods and/or interfaces that also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out.

In accordance with some embodiments, a method is performed at an electronic device including a display and a touch-sensitive surface: displaying, on the display, a first view in a sequence of views; while displaying the first view, receiving an input corresponding to a movement of a contact on the touch-sensitive surface from a first position to a second position; while continuing to detect the contact on the touch-sensitive surface, and in response to receiving the input, preparing to perform a view navigation operation, wherein: in accordance with a determination that the movement of the contact meets single-view navigation criteria, the view navigation operation includes navigating from the first view to a second view that is adjacent to the first view in the sequence of views; and in accordance with a determination that the movement of the contact meets multi-view navigation criteria, the view navigation operation includes navigating from the first view to a third view that is separated from the first view by one or more views in the sequence of views.

In accordance with some embodiments, a non-transitory computer-readable storage medium comprises one or more programs for execution by one or more processors of an electronic device, the one or more programs including instructions which, when executed by the one or more processors, cause the electronic device to: display a first view in a sequence of views; while displaying the first view, receive an input corresponding to a movement of a contact on a touch-sensitive surface from a first position to a second position; while continuing to detect the contact on the touch-sensitive surface, and in response to receiving the input, prepare to perform a view navigation operation, wherein: in accordance with a determination that the movement of the contact meets single-view navigation criteria, the view navigation operation includes navigation from the first view to a second view that is adjacent to the first view in the sequence of views; and in accordance with a determination that the movement of the contact meets multi-view navigation criteria, the view navigation operation includes navigation from the first view to a third view that is separated from the first view by one or more views in the sequence of views.

In accordance with some embodiments, an electronic device comprises: one or more processors; memory; a display and a touch-sensitive surface each coupled to the one or more processors and memory; and one or more programs stored in memory, the one or more programs including instructions for: displaying, on the display, a first view in a sequence of views; while displaying the first view, receiving an input corresponding to a movement of a contact on the touch-sensitive surface from a first position to a second position; while continuing to detect the contact on the touch-sensitive surface, and in response to receiving the input, preparing to perform a view navigation operation, wherein: in accordance with a determination that the movement of the contact meets single-view navigation criteria, the view navigation operation includes navigating from the first view to a second view that is adjacent to the first view in the sequence of views; and in accordance with a determination that the movement of the contact meets multi-view navigation criteria, the view navigation operation includes navigating from the first view to a third view that is separated from the first view by one or more views in the sequence of views.

Thus, devices are provided with faster, more efficient methods and interfaces for movement between multiple views, thereby increasing the effectiveness, efficiency, and user satisfaction with such devices. Such methods and interfaces may complement or replace other methods for movement between multiple views.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram of an example process of moving between multiple views in accordance with some embodiments.

DESCRIPTION OF EMBODIMENTS

Figure 1A:
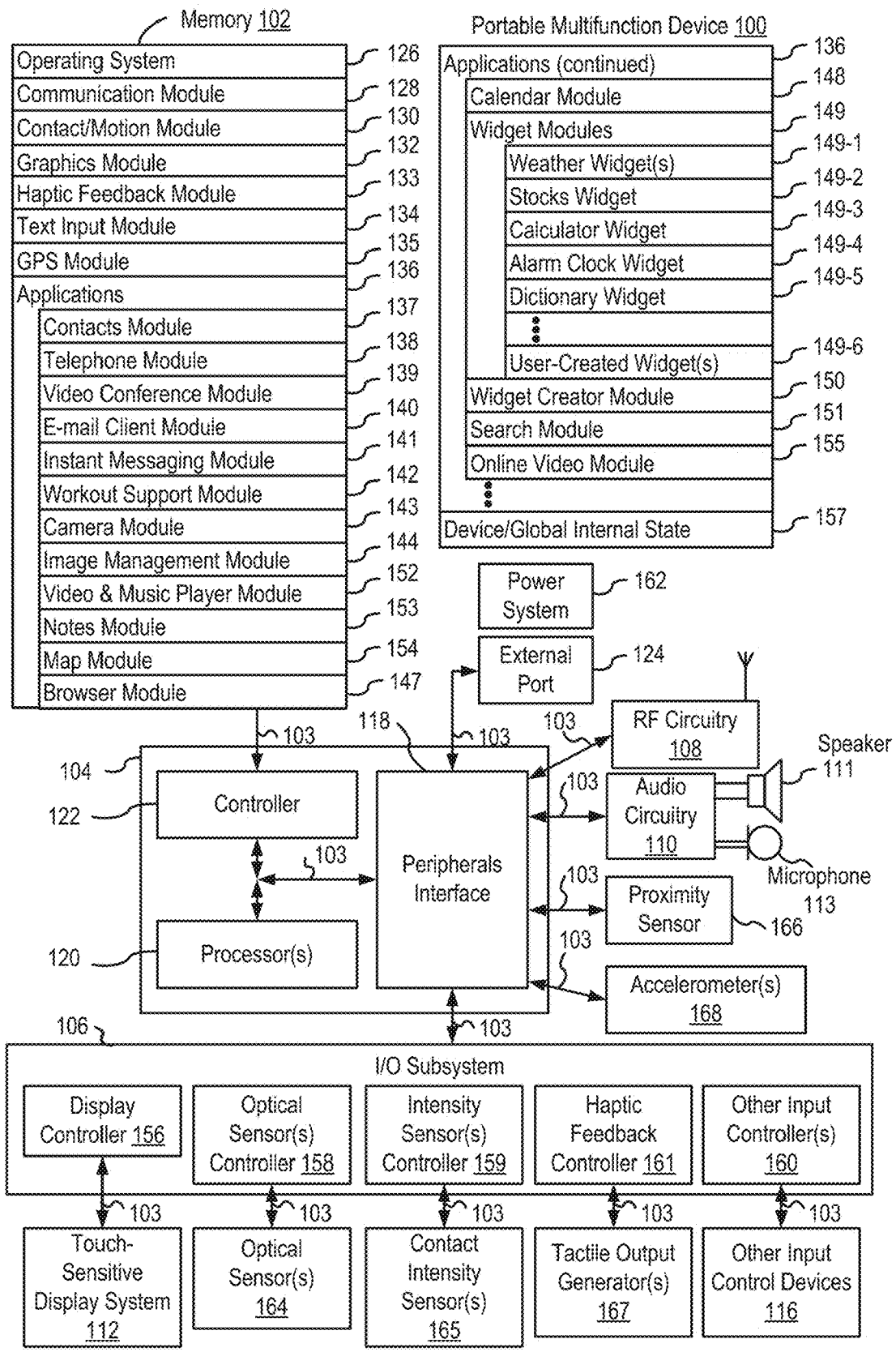
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The present embodiments generally relate to readily moving between multiple views. Specifically, an electronic device enables a user to move from one view or page to another view or page within an application process. For example, an electronic device such as a mobile device enables a user to navigate between views or pages within a web browser. In one instance, a user begins at a first page of a first website and eventually navigates to a third page of the first website. However, the user may then wish to return to the first page from the third page. The foregoing example should not be construed as limiting, and in some embodiments, the user may navigate from a third page to a first page, and then wish to advance back to the third page.

In some embodiments, the electronic device may receive at least two inputs corresponding to two contacts or manipulations by the user desiring to return to the first page. In other words, the electronic device navigates to the second page from the third page, prior to navigating from the second page to the first page. However, such navigating may require the user to enter or engage the electronic device in a repetitious manner in order to navigate each intermediate view or page individually until the desired view or page is displayed. As such, it would desirable for electronic devices to forgo display or navigation of the second page, and to move from the third page to the first page. As such, the present embodiments enables navigation from a first page or view to a third page or view that is separated from the first page or view by one or more views or pages.

Accordingly, there is a need for electronic devices that provide efficient methods and interfaces for movement between multiple views. Such techniques can reduce the cognitive and/or physical burden on a user navigating between multiple views, thereby enhancing efficiency and productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for movement between multiple views. FIGS. 6A-6G illustrate exemplary user interfaces for readily moving between multiple views. The user interfaces in the figures are also used to illustrate the processes described below, including the process in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" can optionally be construed to mean "when" or "upon" or "in response to determining" or "in response to detecting," depending on the context. Similarly, the phrase "if it is determined" or "if [a stated condition or event] is detected" can optionally be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device can optionally support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 can optionally include one or more computer-readable storage mediums. The computer-readable storage mediums can optionally be tangible and non-transitory. Memory 102 can optionally include high-speed random access memory and can optionally also include non-volatile memory, such as one or more magnetic disk storage devices, flash memory devices, or other non-volatile solid-state memory devices. Memory controller 122 can optionally control access to memory 102 by other components of device 100. Executable instructions for performing these functions are, optionally, included in a transitory computer-readable storage medium or other computer program product configured for execution by one or more processors.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 can optionally be implemented on a single chip, such as chip 104. In some embodiments, they can optionally be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data can optionally be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output can optionally include graphics, text, icons, video, and any combination thereof (collectively termed "graphics"). In some embodiments, some or all of the visual output can optionally correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 can optionally use LCD (liquid crystal display) technology, LPD (light emitting polymer display) technology, or LED (light emitting diode) technology, although other display technologies can optionally be used in some embodiments. Touch screen 112 and display controller 156 can optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 can optionally be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 can optionally be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 can optionally have a video resolution in excess of 100 dpi. In some embodiments, the touch screen has a video resolution of approximately 160 dpi. The user can optionally make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 can optionally include a touchpad (not shown) for activating or deactivating particular functions. In some embodiments, the touchpad is a touch-sensitive area of the device that, unlike the touch screen, does not display visual output. The touchpad can optionally be a touch-sensitive surface that is separate from touch screen 112 or an extension of the touch-sensitive surface formed by the touch screen.

Device 100 also includes power system 162 for powering the various components. Power system 162 can optionally include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can optionally also include one or more optical sensors 164. FIG. 1A shows an optical sensor coupled to optical sensor controller 158 in I/O subsystem 106. Optical sensor 164 can optionally include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 can optionally capture still images or video. In some embodiments, an optical sensor is located on the back of device 100, opposite touch screen display 112 on the front of the device so that the touch screen display can optionally be used as a viewfinder for still and/or video image acquisition. In some embodiments, an optical sensor is located on the front of the device so that the user's image can optionally be obtained for video conferencing while the user views the other video conference participants on the touch screen display. In some embodiments, the position of optical sensor 164 can be changed by the user (e.g., by rotating the lens and the sensor in the device housing) so that a single optical sensor 164 can optionally be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 can optionally also include one or more proximity sensors 166. FIG. 1A shows proximity sensor 166 coupled to peripherals interface 118. Alternately, proximity sensor 166 can optionally be coupled to input controller 160 in I/O subsystem 106. Proximity sensor 166 can optionally perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 can optionally also include one or more accelerometers 168. FIG. 1A shows accelerometer 168 coupled to peripherals interface 118. Alternately, accelerometer 168 can optionally be coupled to an input controller 160 in I/O subsystem 106. Accelerometer 168 can optionally perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
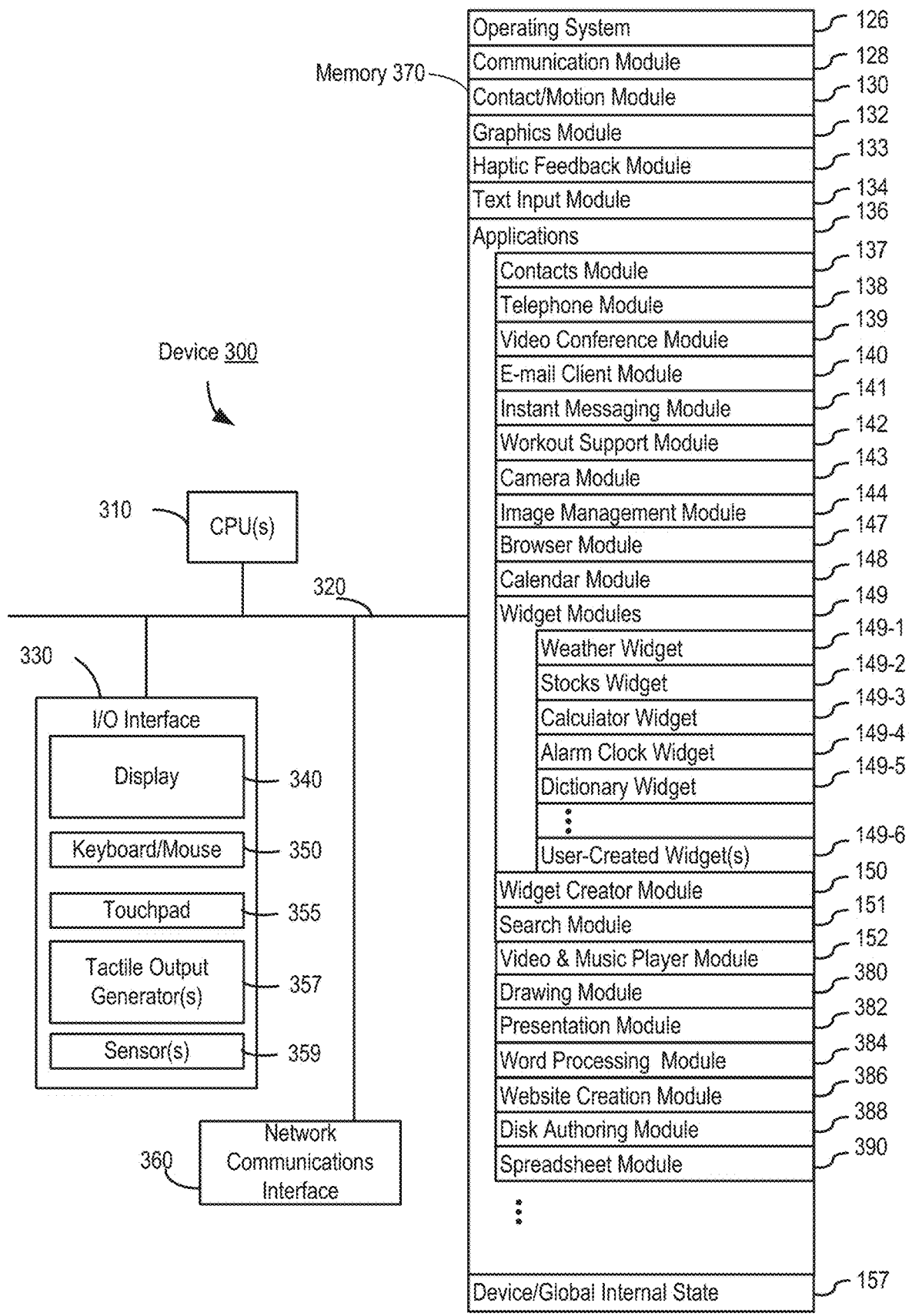
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which can optionally be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 can optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which can optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that can optionally be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 can optionally be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 can optionally be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication can optionally use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages can optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that can optionally be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 can optionally be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 can optionally be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can optionally be combined or otherwise rearranged in various embodiments. For example, video player module can optionally be combined with music player module into a single module (e.g., video and music player module 152, FIG. 1A). In some embodiments, memory 102 can optionally store a subset of the modules and data structures identified above. Furthermore, memory 102 can optionally store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
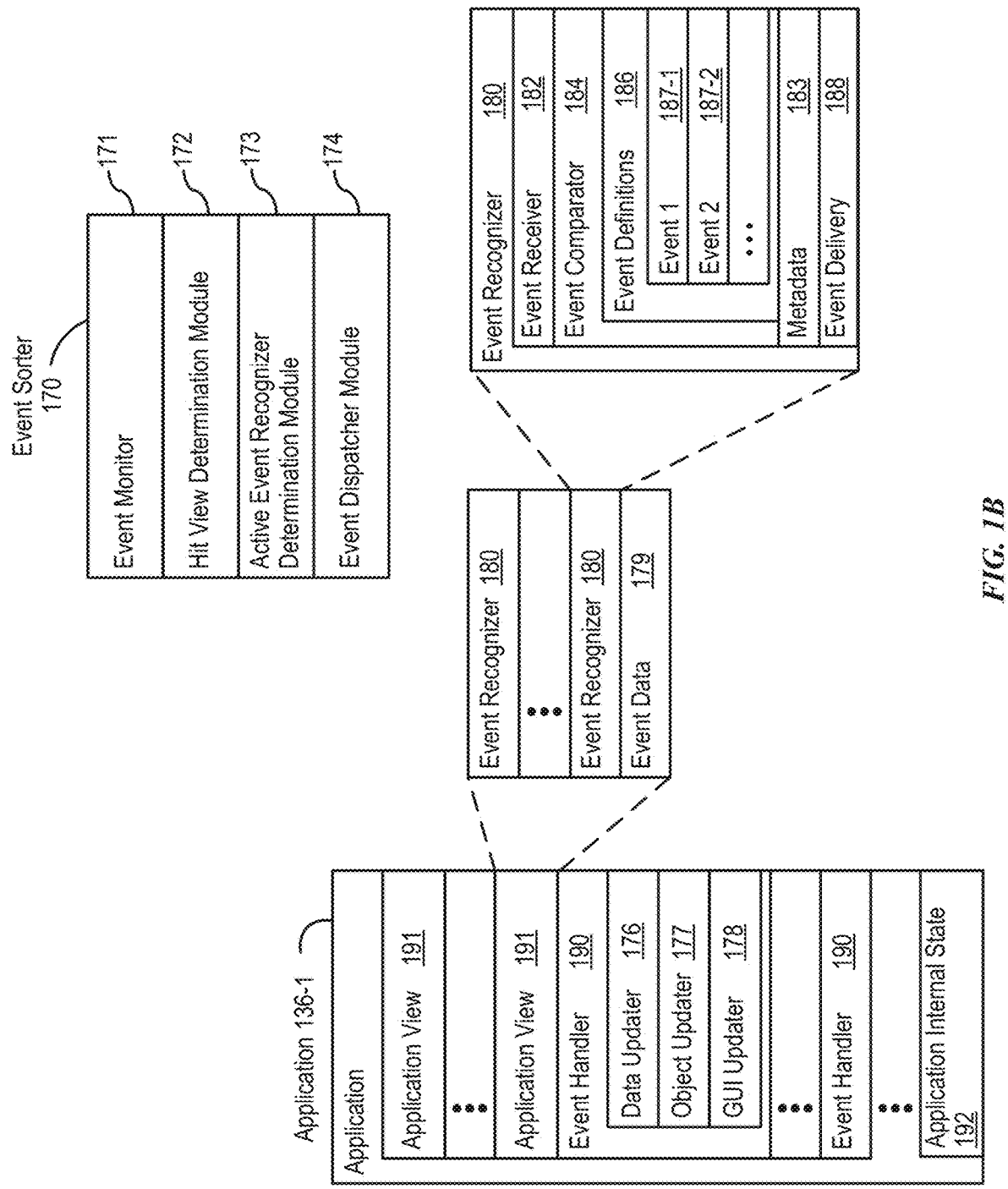
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected can optionally be called the hit view, and the set of events that are recognized as proper inputs can optionally be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 can optionally utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which can optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information can optionally also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
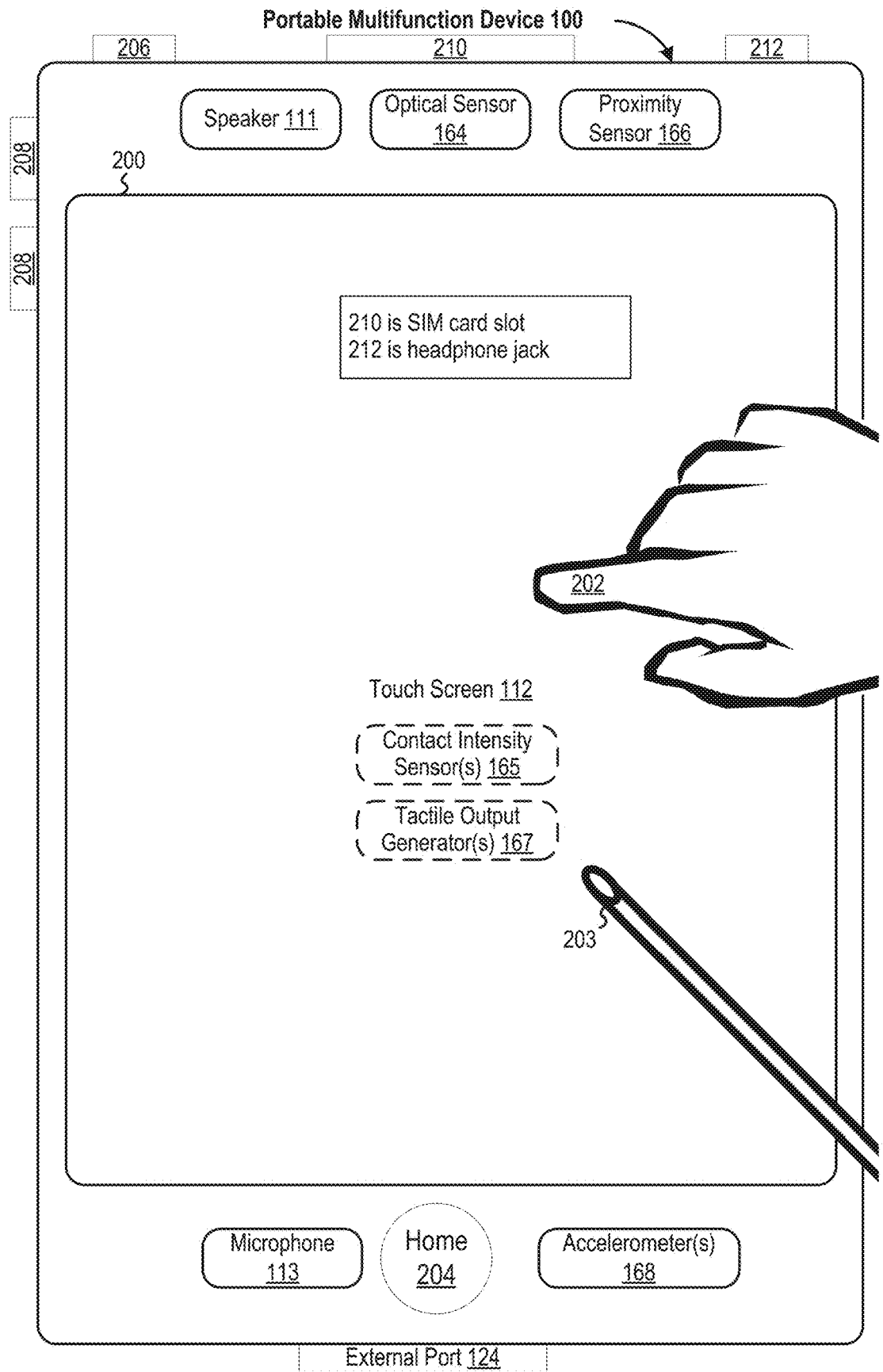
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 can optionally also include one or more physical buttons, such as "home" or menu button 204. As described previously, menu button 204 can optionally be used to navigate to any application 136 in a set of applications that can optionally be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 can optionally be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules can optionally be combined or otherwise rearranged in various embodiments. In some embodiments, memory 370 can optionally store a subset of the modules and data structures identified above. Furthermore, memory 370 can optionally store additional modules and data structures not described above.

Attention is now directed towards embodiments of user interfaces that can optionally be implemented on, for example, portable multifunction device 100.

Figure 4A:
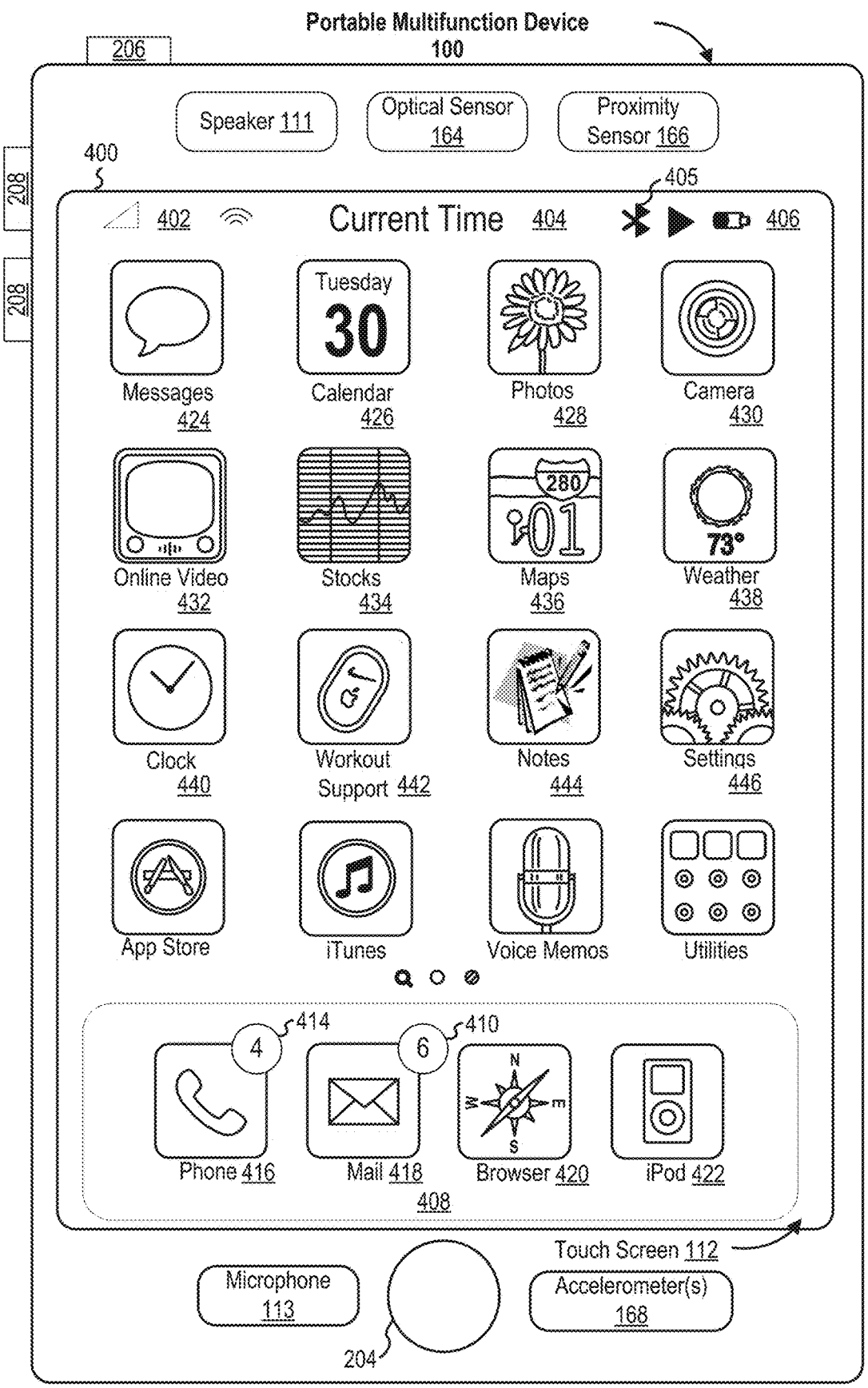
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces can optionally be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 can optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
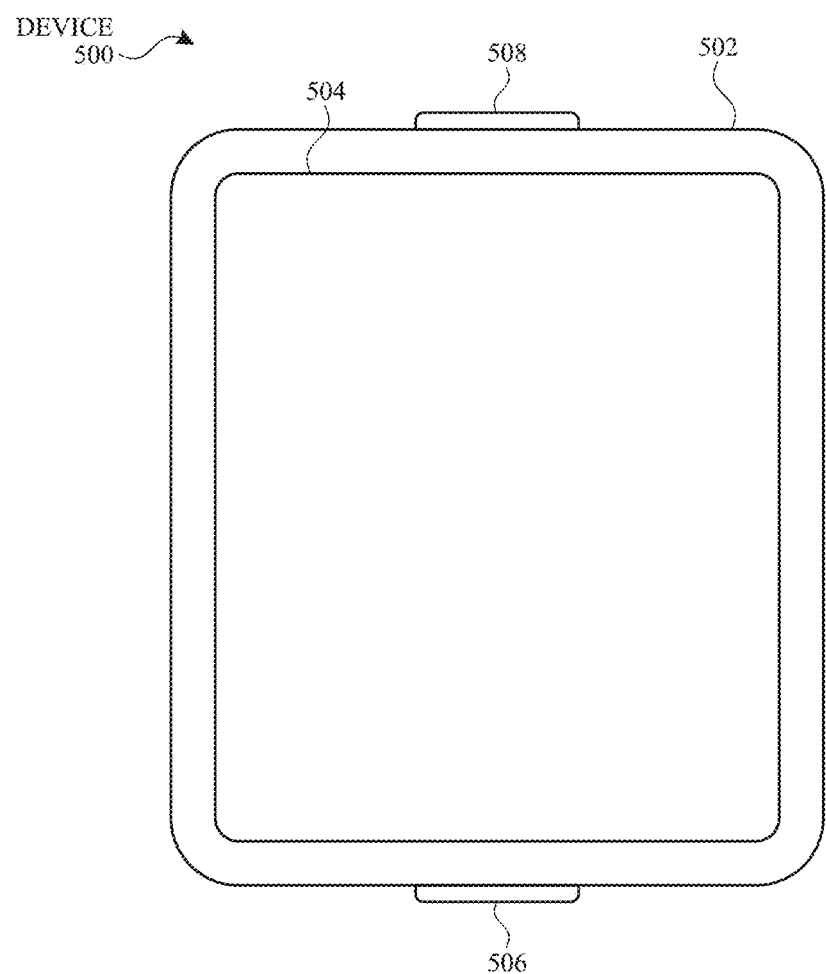
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) can optionally have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
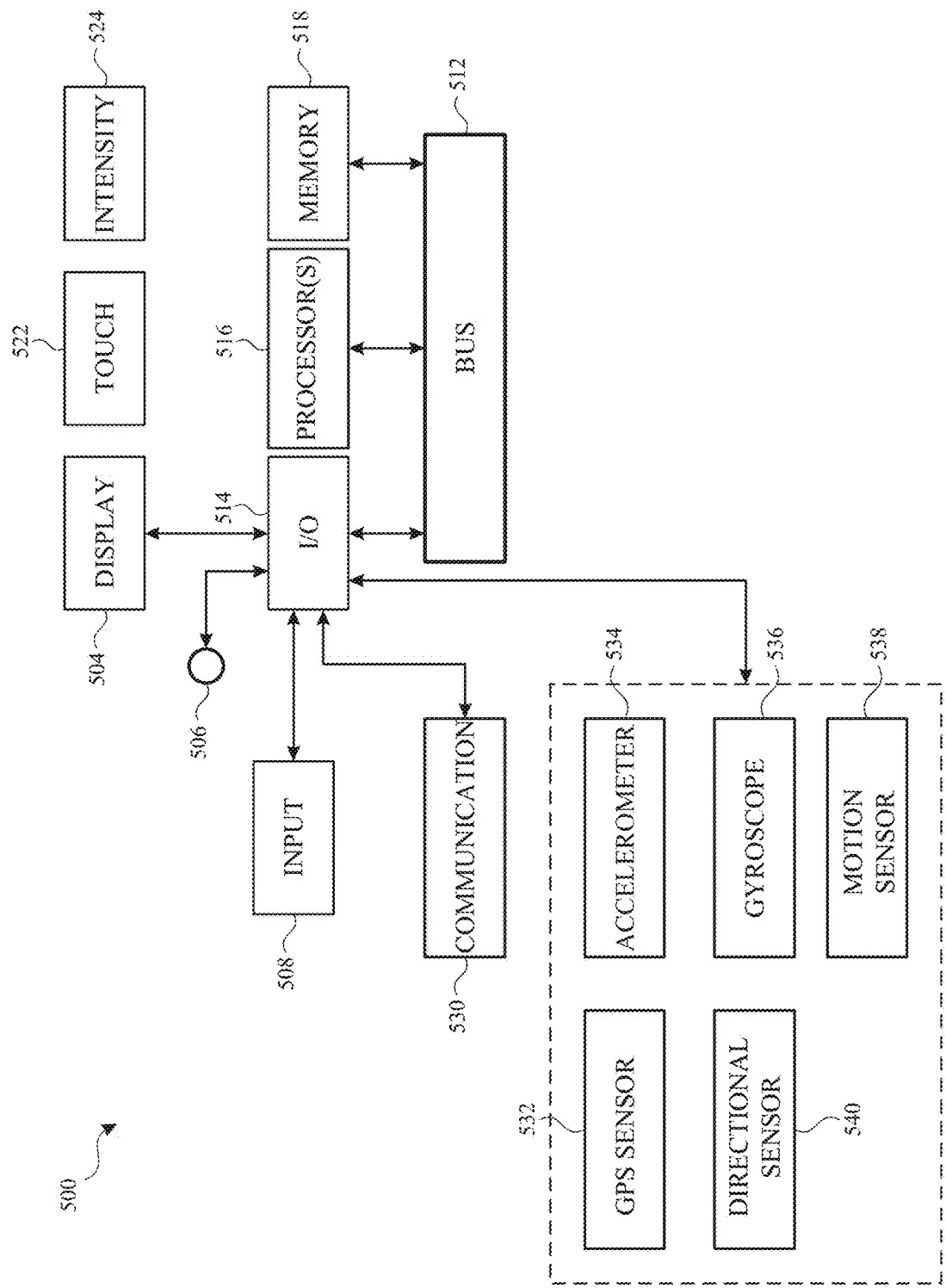
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 can optionally be a rotatable input device or a depressible and rotatable input device, for example. Input mechanism 508 can optionally be a button, in some examples.

Input mechanism 508 can optionally be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 702-712 (FIG. 7). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations. Executable instructions for performing these functions are, optionally, included in a transitory computer-readable storage medium or other computer program product configured for execution by one or more processors.

As used here, the term "affordance" refers to a user-interactive graphical user interface object that can be displayed on the display screen of devices 100, 300, and/or 500 (FIGS. 1, 3, and 5). For example, an image (e.g., icon), a button, and text (e.g., hyperlink) each can optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds can optionally include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location can optionally be based on only a portion of the continuous swipe contact, and not the entire swipe contact (e.g., only the portion of the swipe contact at the end location). In some embodiments, a smoothing algorithm can optionally be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6A:
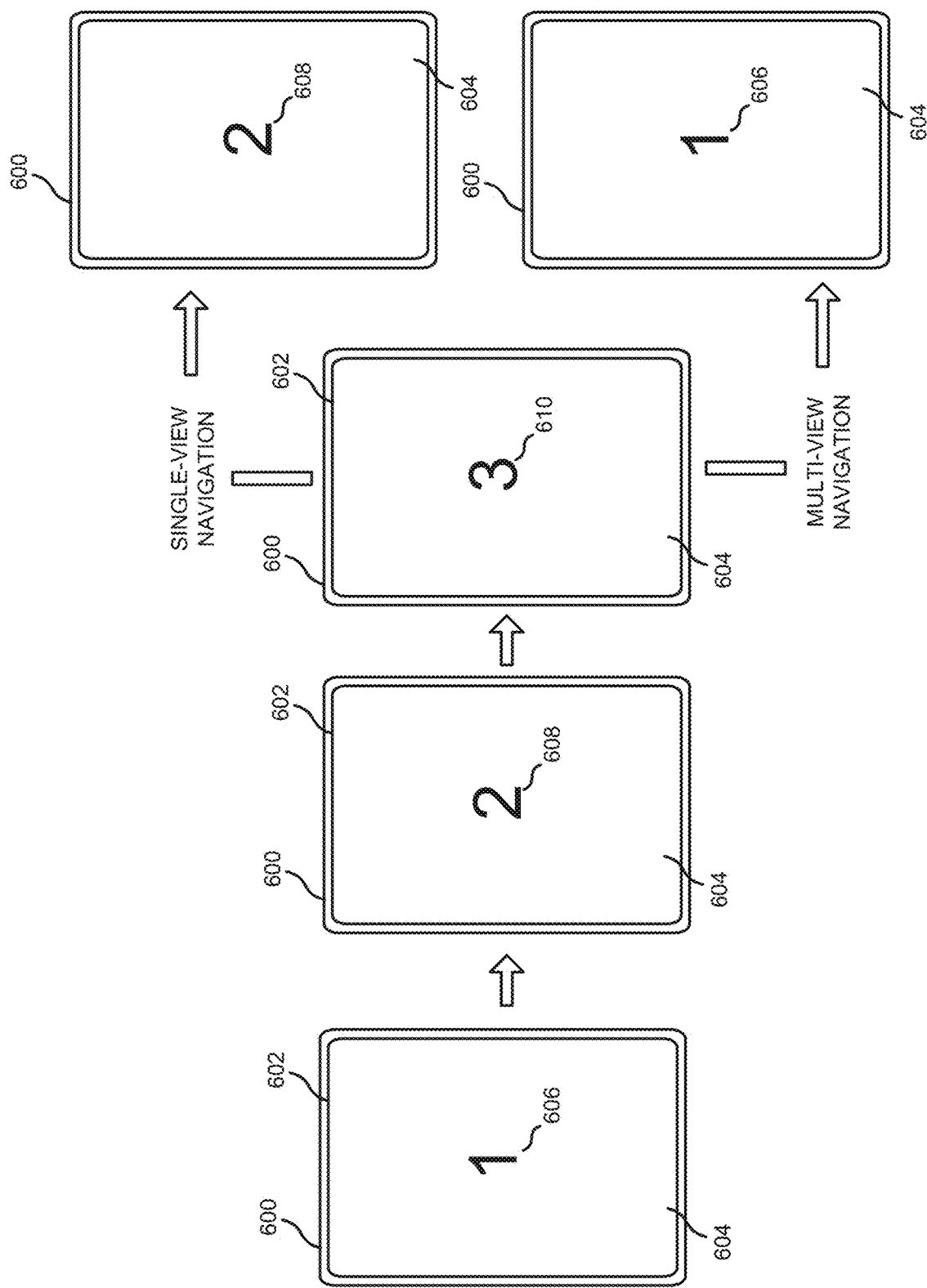
FIG. 6A illustrates example user interfaces for backward movement between multiple views in accordance with some embodiments.
Figure 6B:
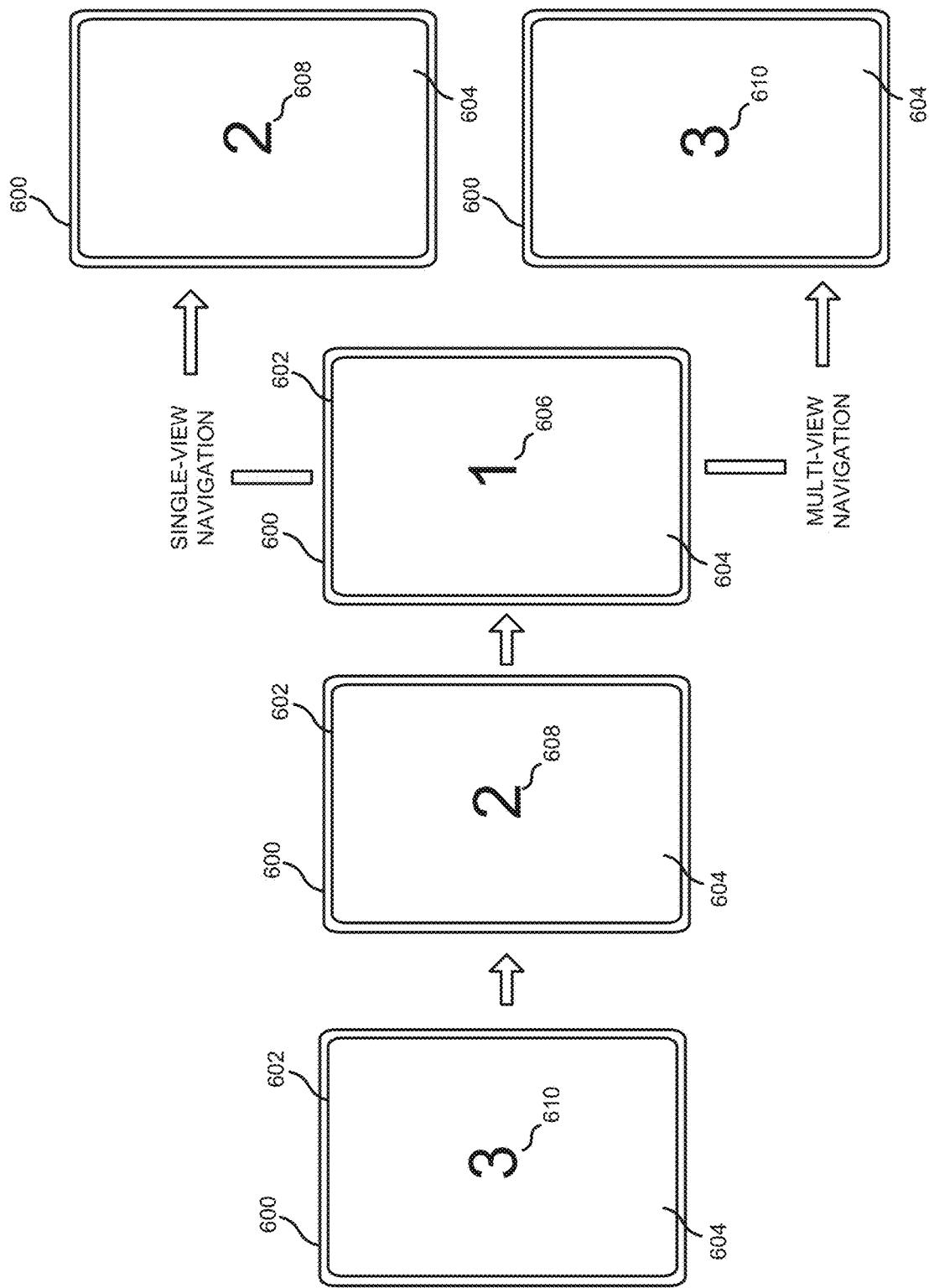
FIG. 6B illustrates example user interfaces for forward movement between multiple views in accordance with some embodiments.

FIGS. 6A and 6B illustrate example user interfaces for movement between multiple views in accordance with some embodiments. In one embodiment, FIG. 6A illustrates example user interfaces for backward movement between multiple views or pages. In some embodiment, FIG. 6B illustrates example user interfaces for forward movement between multiple views or pages.

Referring to FIG. 6A, for example, an electronic device 600 includes display 602 and touch-sensitive surface 604. In some embodiments, electronic device 600 can optionally be the same as or similar to portable multifunction device 100 (FIG. 1), multifunction device 300 (FIG. 3), and/or personal electronic device 500 (FIG. 5). Further, in some embodiments, display 602 and touch-sensitive surface 604, either individually or in combination, can optionally be the same as or similar to one touch-sensitive display system 112 (FIG. 1), display 340 (FIG. 3), touchpad 355 (FIG. 3), and/or touch-sensitive display screen 504 (FIG. 5).

Electronic device 600 is configured to navigate to and/or from one or more views displayed on display 602, and in response to one or more inputs received on touch-sensitive surface 604. In some embodiments, electronic device 600 initially displays, on display 602, a first view 606. As shown on FIG. 6A, the first view 606 can optionally be indicated as number "1". In some embodiments, a view can optionally be or otherwise include a set of content displayed on display 602. For example, a view can be one or more of a webpage, a page of an electronic book/journal/magazine, and/or a page of an application process. For example, the first view 606 can optionally be any page of a news reader application process. In another example, the first view 606 can optionally be a homepage of a website. In yet another example, the first view 606 can optionally be any page of an electronic book. It should be understood that first view 606 is not limited to the foregoing examples.

In some embodiments, electronic device 600 then displays a second view 608, which is indicated as number "2", upon receiving an input representing or otherwise corresponding to a selection of second view 608. In an aspect, electronic device 600 displays second view 608 in response to a selection of an affordance or a series of affordances. For instance, first view 606 is a webpage including one or more affordances (e.g., hyperlinks) to other webpages within the same or different domain. In another example, first view 606 is a first page of a new reader application process including one or more page movement affordances (e.g., forward and backward affordances). As such, upon selection of one of the affordances from the one or more affordances (e.g., forward affordance), or other user input, electronic device 600 ceases display of first view 606 and display second view 608. In other words, electronic device 600 replaces, on display 602, first view 606 with second view 608. In some embodiments, electronic device is configured to partially replace first view 606 with second view 608, such that a portion of first view 606 visible, usable for quick navigation back to first view 606 from second view 608, and even with user finger 620 not touching the device.

Additionally, electronic device 600 displays, on display 602, third view 610, which is indicated as number "3", upon receiving an input representing or otherwise corresponding to of third view 610. In an aspect, electronic device 600 displays third view 610 in response to a selection of an affordance or a series of affordances. For example, second view 608 is a webpage including one or more affordances (e.g., hyperlinks) to other webpages within the same or different domain. In another example, second view 608 is a second page of a new reader application process including one or more page movement affordances (e.g., forward and backward affordances). As such, upon selection of one of the affordances from the one or more affordances (e.g., forward affordance), or other user input, electronic device 600 ceases display of second view 608 and display third view 610. In other words, electronic device 600 replaces, on display 602, second view 608 with third view 610.

In some embodiments, after traversing or navigating from second view 608 to third view 610, a user may desire to return to first view 606 from third view 610, without having to traverse or navigate initially to second view 608 before eventually returning to first view 606. In other words, a user may desire to navigate between multiple views without having to navigate or perform additional repetitive gestures or contacts with touch-sensitive surface 604 for navigating or traversing intermediate views before reaching the desired view (e.g., first view 606). As such, electronic device 600 prepares to perform a multi-view navigation operation and subsequently navigates between multiple views based on or otherwise in response to receiving a multi-view navigation input.

For instance, while displaying third view 610, electronic device 600 receives an input from a user on touch-sensitive surface 604. Electronic device 600 determines the type or pattern of the received input. That is, in some embodiments, electronic device 600 receives or otherwise detects a single-view navigation input. For example, the single-view navigation input corresponds to a detection of a horizontal swipe gesture across touch-sensitive surface 604 (or a swipe in a predominantly horizontal direction). Accordingly, electronic device 600 prepares to perform a single-view navigation operation and subsequently returns or navigates from third view 610 to second view 608 (e.g., "single-view navigation").

In some embodiments, electronic device 600 receives or otherwise detects a multi-view navigation input and enables navigation between multiple views. For instance, the multi-view navigation input corresponds to a detection of a horizontal swipe gesture that decelerates proximate an edge of the touch-sensitive surface 604. As such, electronic device 600 returns or navigates from third view 610 to first view 606 (e.g., "multi-view navigation"). The present embodiments are not limited to navigating between third view 610 and first view 606 with respect to multi-view navigation. That is, electronic device 600 navigates from a current view to a previous view, separated by one or more views. Accordingly, in the examples illustrated in FIG. 6A, third view 610 is separated from first view 606 by one or more views (e.g., including second view 608). As such, the present embodiments enable electronic device 600 to navigate between multiple views based on or in response to receiving a single input.

Referring to FIG. 6B, example user interfaces are illustrated for forward movement following a series or sequence of backward movements between multiple views in accordance with some embodiments. For example, electronic device 600 initially displays third view 610. In response to receiving an input on touch-sensitive surface 604, electronic device 600 navigates to from the third view 610, which is higher or succeeds other views in a sequence of views, to second view 608. In other words, electronic device 600 navigates in a backward manner with respect to a sequence of views from a higher order view (e.g., third view 610) to a lower order view (e.g., second view 608). In some embodiments, a user of electronic device 600 may desire to return or move back from third view 610 to second view 608.

Further, electronic device 600 navigates from second view 608 to first view 606. In some embodiments, the second view 608 is higher or succeeds the first view 606 in the sequence of views, yet is lower or precedes the third view 610 in the sequence of views. For instance, a user may again desire to return or move back from second view 608 to first view 606, which precedes the second view 608. In other words, electronic device 600 navigates in a backward manner with respect to a sequence of views from a higher order view (e.g., second view 608) to a lower order view (e.g., first view 606).

Following navigation from third view 610 to first view 606, which is separated by one or more views (e.g., second view 608), electronic device 600 determines a type or pattern of input corresponding to a forward movement or navigation, and received on touch-sensitive surface 604 while displaying first view 606. That is, following a number of successive movements (e.g., two or more) from one view to another view (e.g., from third view 610 to first view 606 via second view 608) in a backward or preceding manner in the sequence of views, electronic device 600 prepares to perform a view navigation operation and subsequently move or navigate in a forward manner in the sequence of views to one of the second view 608 or the third view 610. Specifically, electronic device 600 navigates to prepare to perform a single-view navigation operation and subsequently navigate to second view 608 in response to receiving an input corresponding to single-view navigation. However, electronic device 600 prepares to perform a multi-view navigation operation and subsequently navigate to third view 610, which is separated from first view 606 by one or more views, in response to receiving an input corresponding to multi-view navigation.

Figure 6C:
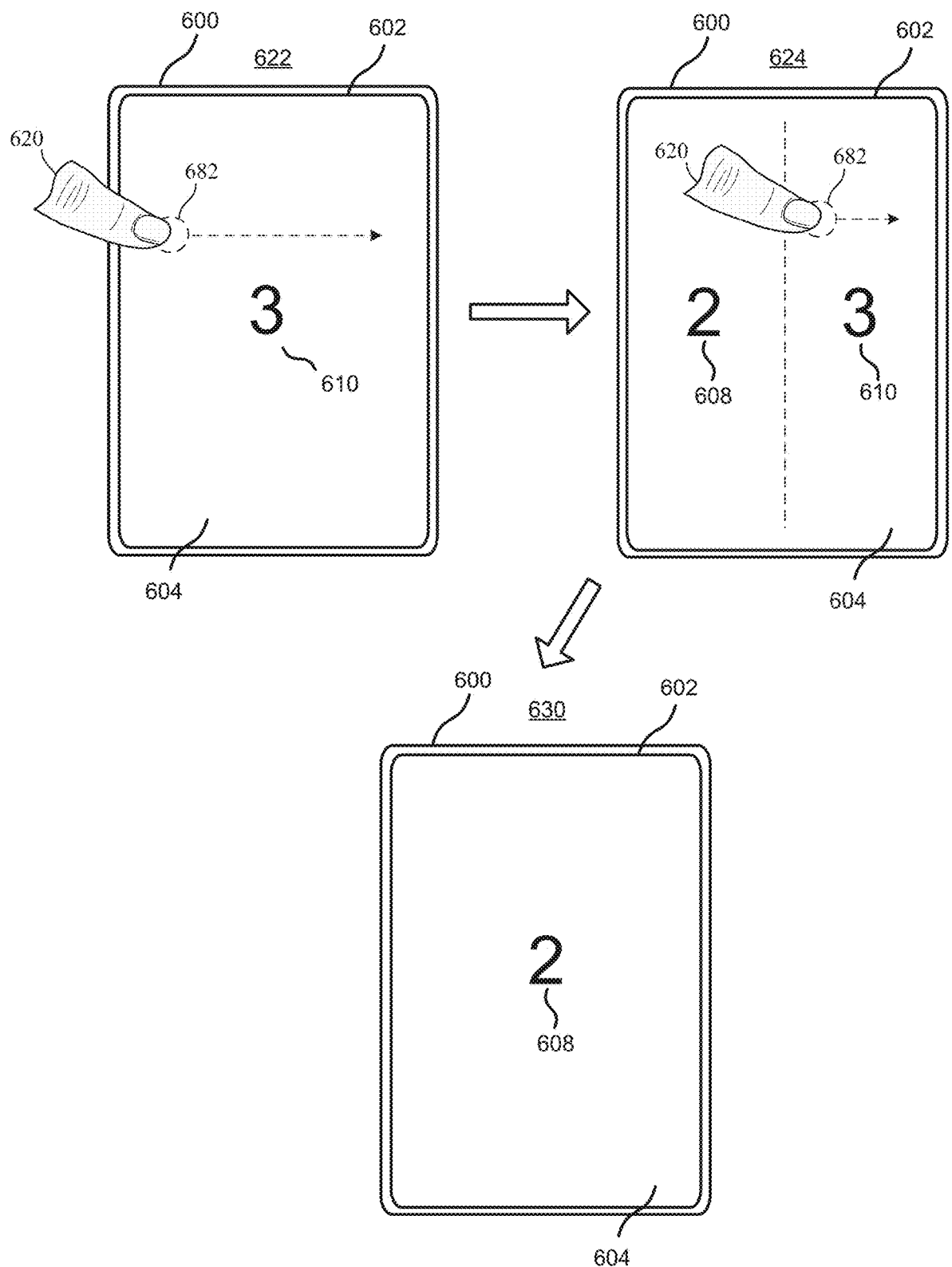
FIG. 6C illustrates example user interfaces for single-view movement between multiple views in accordance with some embodiments.

FIG. 6C illustrates example user interfaces for movement between views in accordance with some embodiments, for example, the embodiments described with respect to the preparation of performing a single-view navigation operation, which corresponds to navigation from third view 610 to second view 608 in FIG. 6A. In some embodiments, the movement or navigation illustrated and described in FIG. 6C is referred to as backward movement or navigation in a sequence of views, where the second view 608 precedes the third view 610.

FIG. 6C illustrates a non-limiting series of user interfaces illustrating navigation between multiple views of a single-view operation. For example, at user interface 622, electronic device 600 displays, on display 602, third view 610. In some embodiments, first view 606, second view 608, and third view 610 are each a respective view in a sequence of views. For example, third view 610 is a third page of an application process (e.g., news reader application process). Further, the sequence of views is a series or hierarchy. As such, each respective view is positioned or arranged based on a time domain parameter and/or a browser history (as described further with regard to FIG. 6I).

While displaying user interface 622, electronic device 600 receives an input corresponding to a movement of a contact 682 on the touch-sensitive surface 604. For example, the movement of the contact 682 is representative of a user finger 620 in contact with and moving across the touch-sensitive surface 604 in a direction corresponding to a desired navigation between views. In other words, electronic device 600 detects a movement of an object having a horizontal component such as, but not limited to, a user finger 620 from a location proximate one edge of the display to a location proximate another edge.

In response to receiving the input corresponding to the movement of the contact 682 (e.g., corresponding to user finger 620) on touch-sensitive surface 604, electronic device 600, at user interface 624, displays a view navigation or transition animation whereby a portion of the third view 310 is displayed on display 602, as well as a portion of the second view 608, which is a view preceding the third view 610 by one view in a sequence of views. As such, at user interface 624, electronic device 600 prepares to perform a single-view navigation operation, which includes or otherwise corresponds to a movement or navigation from third view 610 to second view 608.

It should be understood that the dashed lines indicate a view or page separation. For example, at user interface 624, the dashed line in the middle of display 602 indicates a portion of display 602 displaying second view 608 and another portion of display 602 displaying third view 610. Additionally, the dashed line indicating distinct views and/or a boundary between views can be optionally displayed on display 602 in various forms (e.g., dashed, solid, etc.). At user interface 624, electronic device 600 detects liftoff of the contact 682 (e.g., corresponding to user finger 620), ceases display of the prepared single-view navigation animation, and displays second view 608 at user interface 630.

Figure 6D:
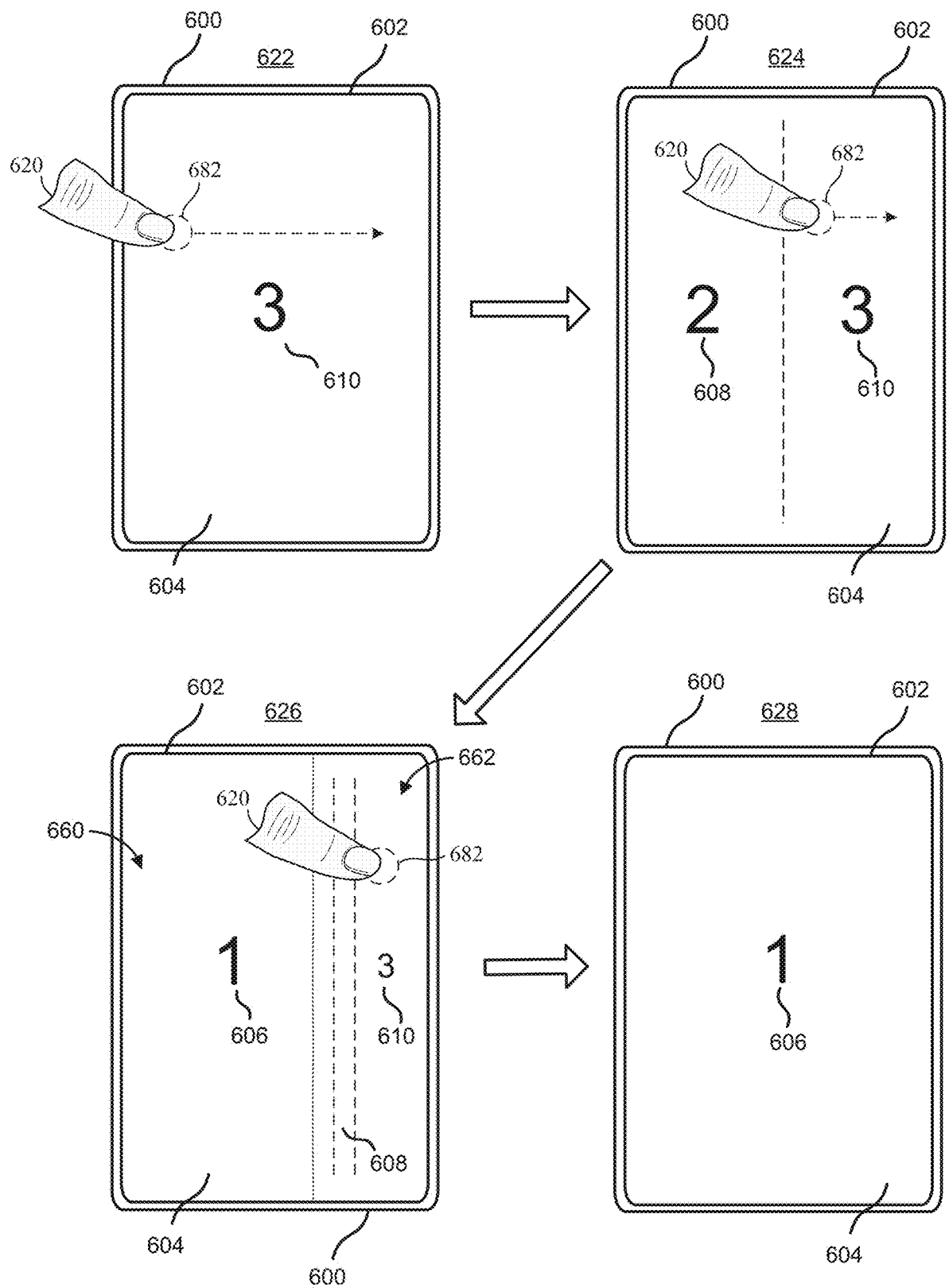
FIG. 6D illustrates example user interfaces for multi-view movement between multiple views in accordance with some embodiments.

FIG. 6D illustrates example user interfaces for movement between multiple views in accordance with some embodiments, for example, the embodiments described with respect to the preparation of performing a multi-view navigation operation, which corresponds to navigation from third view 610 to first view 606 in FIG. 6A. In some embodiments, the movement or navigation illustrated and described in FIG. 6D is referred to as backward movement or navigation in a sequence of views, where the first view 606 precedes the third view 610 by one or more views.

In particular, FIG. 6D includes a non-limiting series of user interfaces illustrating navigation between multiple views. For example, at user interface 622, electronic device 600 displays, on display 602, third view 610. In some embodiments, first view 606, second view 608, and third view 610 are each a respective view in a sequence of views. For example, third view 610 is a third page of an application process (e.g., news reader application process). Further, the sequence of views is a series or hierarchy. As such, each respective view is positioned or arranged based on a time domain parameter and/or a browser history (as described further with regard to FIG. 6I).

While displaying user interface 622, electronic device 600 receives an input corresponding to a movement of a contact 682 on the touch-sensitive surface. For example, the movement of the contact 682 is representative of a user finger 620 in contact with and moving across the touch-sensitive surface 604 in a direction corresponding to a desired navigation between views. In other words, electronic device 600 detects a movement of an object having a horizontal component such as, but not limited to, a user finger 620 from a location proximate one edge of the display to a location proximate another edge.

In response to receiving the input corresponding to the movement of the contact 682 (e.g., corresponding to user finger 620) on touch-sensitive surface 604, electronic device 600, at user interface 624, displays a view navigation or transition animation whereby a portion of the third view 310 is displayed on display 602, as well as a portion of the second view 608, which is a view preceding the third view 610 by one view in a sequence of views. It should be understood that the dashed lines indicate a view or page separation. For example, at user interface 624, the dashed line in the middle of display 602 indicates a portion of display 602 displaying second view 608 and another portion of display 602 displaying third view 610. Additionally, the dashed line indicating distinct views and/or a boundary between views is optionally displayed on display 602 in various forms (e.g., dashed, solid, etc.).

At user interface 626, the user may desire to move between more than one view in the sequence of views. That is, the user may desire to return to the first view 606 from the third view 610 without navigating to, or having fully displayed, second view 608. As such, at user interface 626, electronic device 600 detects movement of the contact 682 on the touch-sensitive surface 604 from the first position at user interface 622 to a second position at user interface 626. Accordingly, electronic device 600, prepares performance of a view navigation operation (e.g., multi-view navigation) while continuing to detect the contact 682 on the touch-sensitive surface 604 (e.g., corresponding to contact by user finger 620 at second position).

In some embodiments, electronic device 600 navigates from the third view 610 to second view 608 that is adjacent to the third view 610 in the sequence of views in accordance with a determination that the movement of the contact 682 meets single-view navigation criteria. For instance, electronic device 600 navigates from the third view 310 directly to the first view 606 that is separated from the third view 610 by one or more views in the sequence of views (e.g., including the second view 608) in accordance with a determination that the movement of the contact 682 (e.g., corresponding to user finger 620) meets multi-view navigation criteria.

In some embodiments, electronic device 600 determines that movement of the contact 682 has decelerated below a threshold level at a multi-view region of the touch-sensitive surface 604. As such, electronic device 600 displays, at user interface 628, first view 606 on display 602. Otherwise, at user interface 624, electronic device 600 determines that movement of the contact 682 (e.g., corresponding to user finger 620) on the touch-sensitive surface 604 meets single-view navigation criteria, and navigates from the third view 610 to the second view 608. In such example, the third view 610 precedes the first view 606 in the sequence of views. As such, third view 610 is the last view in the sequence of views, whereas the first view 606 is the initial view in the sequence. In some embodiments, third view 610 is the initial view in the sequence of views, whereas the first view 606 is the last view in the sequence.

In some embodiments, touch-sensitive surface 604 includes a first region 660 and a second region 662 separate or distinct from the first region. For example, the first region 660 corresponds to a single view navigation region where movement of the contact 682 from a first location to a second location within the single view navigation region and an end of the input (e.g., subsequent liftoff of the contact 682) triggers (e.g., causes the electronic device 600 to perform) a single-view navigation operation (e.g., moving from third view 610 to second view 608). Further, second region 662 corresponds to a multi-view navigation region where movement of the contact 682 from a first location to a second location within or to the multi-view navigation region and an end of the input (e.g., subsequent liftoff of the contact 682) therein triggers (e.g., causes the device to perform) a multi-view navigation operation (e.g., moving from third view 610 to first view 606).

Electronic device 600 determines whether the movement of the contact 682 meets single-view navigation criteria or multi-view navigation criteria based on one or more embodiments. In some embodiments, for example, the single-view navigation criteria includes a determination by the electronic device 600 that the multi-view navigation criteria is not met. Further, the single-view navigation criteria includes a determination by electronic device 600 that the first input corresponds to movement only in the first region 660. In some embodiments, the single-view navigation criteria includes determining that the first input corresponds to a swipe from an edge of the touch-sensitive surface 604 within the first region 660. For instance, electronic device 600 determines that a detected contact 682 (e.g., corresponding to user finger 620, which corresponds to or otherwise be in contact with touch-sensitive surface 604), engages in a swipe gesture from a left edge of touch-sensitive surface 604 towards the opposite edge and within the first region 660 (e.g., as shown in user interface 624).

Additionally, in some embodiments, electronic device 600 determines that the movement of the contact 682 (e.g., the contact corresponding to user finger 620) meets multi-view navigation criteria based on a determination that the first input corresponds to a swipe that starts in the first region and transitions into the second region. For example, user finger 620 begins in first region 660 (e.g., user interface 622), continues movement through first region 660 (e.g., user interface 624), and transitions in to second region 662 (e.g., user interface 626).

In some embodiments, the multi-view navigation criteria includes a determination by electronic device 600 that the first input corresponds to a contact 682 that decelerates within the second region 662. In some embodiments, the contact 682 decelerates by at least a minimum amount within the second region 662. Thus, in some embodiments, electronic device 600 detects whether the contact 682 (e.g., via user finger) decelerates to a value below a threshold within the second region 662.

In some embodiments, the multi-view navigation criteria includes a determination at electronic device 600 that the contact 682 has remained in the second region 662 of the touch-sensitive surface 604 for a period of time meeting or exceeding a time threshold. For instance, a time tracks the time of the contact 682 (e.g., swipe gesture by user finger 620) in each region. As such, the time value associated with a length in the second region 662 is compared to a multi-view navigation threshold. In some embodiments, the multi-view navigation threshold is a time value selected in a range of 1 millisecond to 3 seconds.

Further, electronic device 600, at user interface 626, receives a second input corresponding to liftoff of the contact 682 from the touch-sensitive surface 604, after preparing to perform the view navigation operation. For example, at user interface 626, a user liftoffs user finger 620 from touch-sensitive surface 604 after electronic device 600 prepares to perform the multi-view navigation operation. Accordingly, electronic device 600 performs the view navigation operation (e.g., multi-view navigation operation) in response to receiving the second input (e.g., liftoff of the user finger 620 from touch-sensitive surface 604).

In some embodiments, electronic device 600 displays and/or animate a stacking representation of views while detecting the movement of the contact 682 on the touch-sensitive surface 604 from the first position to the second position (e.g., when the multi-view navigation criteria will be satisfied upon liftoff at the current location of the contact 682, so as to indicate to the user that a multi-view navigation that liftoff of the contact 682 at the current location will cause a multi-view navigation operation to be performed, rather than a single-view navigation operation). For example, as the user swipes across touch-sensitive surface 604, a stacked representation of the views is displayed on display 602. As shown at user interface 626, the stacked representation includes second view 608 and third view 610 on top of or adjacent to second view 608.

Specifically, electronic device 600 displays a stacked view representation of a plurality of portions (e.g., a portion of second view 608 and third view 610) each corresponding to a view of the one or more views separating the first view 606 from the third view 610. The stacked view representation is a dynamic image of a plurality of views that is formed of the views between the first view 606 and the third view 610, and including the third view 610. The display of the stacked view representation is, optionally, displayed in accordance with a determination that the movement of the contact 682 (e.g., corresponding to user finger 620) meets multi-view navigation criteria.

In some embodiments, the first portion represents the first view 606 of the one or more views separating the first view 606 from the third view 610. Additionally, the second portion represents a second view 608 of the one or more views separating the first view 606 from the third view 610, and different than the first view 606 of the one or more views separating the first view 606 from the third view 610. In some embodiments, electronic device 600 displays the first portion of the stacked view representation prior to displaying the second portion of the stacked view representation.

In some embodiments, the number of portions in the plurality of portions is less than the number of views of the one or more views separating the first view 606 from the third view 610. Further, the first portion and the second portion of the stacked view representation is displayed at an angle with respect to a vertical axis. For example, the stacked view representation is initially displayed parallel to the vertical axis and gradually rotates as the user continues to swipe through the second region 662. In some embodiments, the stacked view representation continues to be displayed parallel to the vertical axis as the electronic device receives the input from the first region 660 and through the second region 662 (e.g., corresponding to user swiping through second region 662).

Figure 6E:
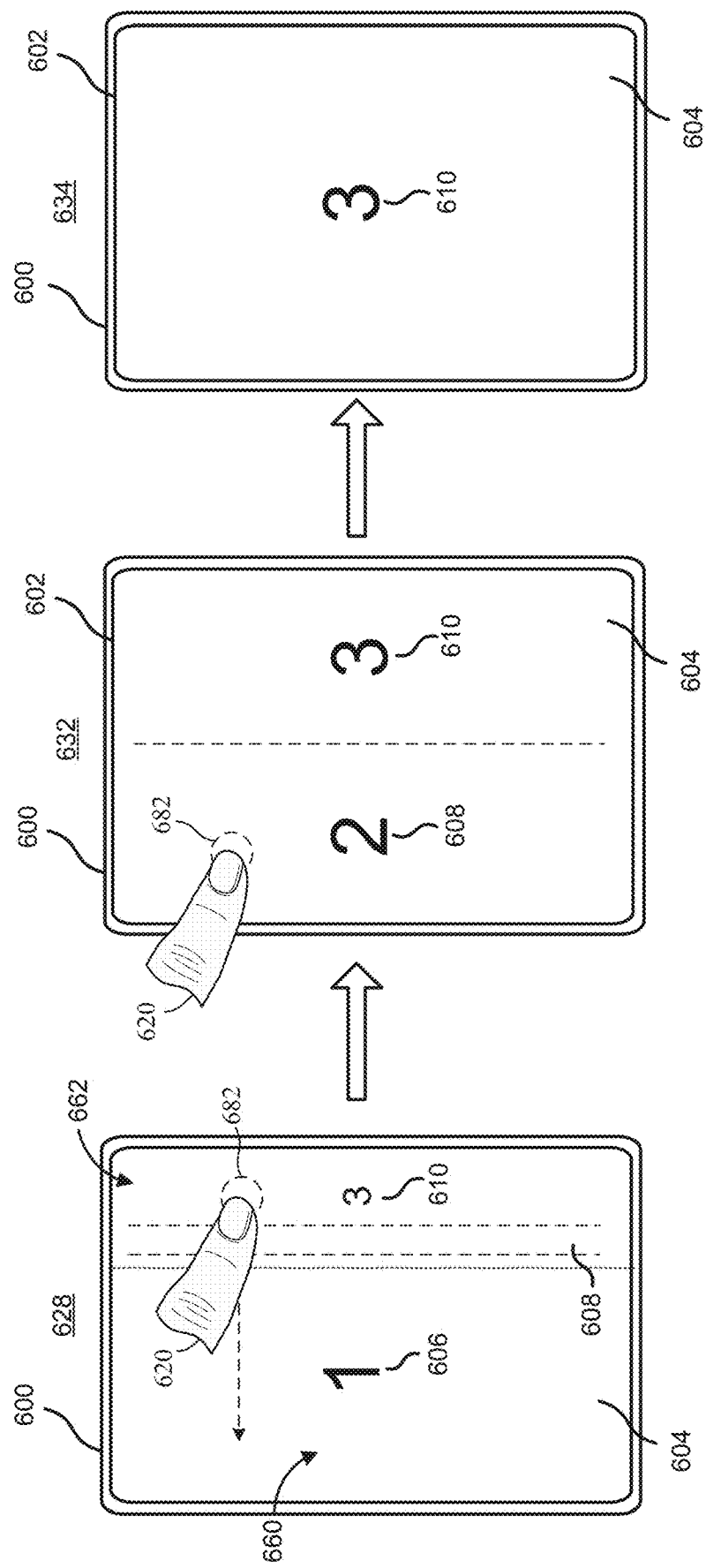
FIG. 6E illustrates example user interfaces for disengaging the preparation of backward movement between multiple views in accordance with some embodiments.

FIG. 6E illustrates example user interfaces for disengaging the preparation of movement between multiple views in accordance with some embodiments. For example, the embodiments illustrated and described with respect to FIG. 6E begins at user interface 628, as shown in FIG. 6D. Specifically, electronic device 600 ceases display of the stacked view representation including second view 608 and third view 610 at user interface 628 based on, for example, movement of the contact 682 (e.g., corresponding to user finger 620) out of the second region 662 and into the first region 660. By disengaging from preparation of the multi-view navigation operation, the user returns to third view 610 (corresponding to user interface 622 of FIG. 6C).

In some embodiments, electronic device 600, after or during display of the stacked view representation at user interface 628, determines whether a stacked view representation deconstruction criteria is met. Accordingly, electronic device 600 ceases to display the stacked view representation in user interface 632 in accordance with a determination that the stacked view representation deconstruction criteria is met. For example, in some embodiments, electronic device 600 ceases to display the second portion (e.g., second view 608) of the stacked view representation prior to ceasing to display the first portion (e.g., third view 610) of the stacked view representation.

In some embodiments, the stacked view representation is deconstructed based on a determination at electronic device 600 that movement of the contact 682 meets the single-view navigation criteria (e.g., detecting movement of user finger 620 back into first region 660). Additionally, at user interface 632, electronic device 600 displays second view 608 in response to a liftoff of contact 682 during single-view navigation. Otherwise, electronic device 600 displays third view 610 when neither single-view navigation criteria nor multi-view navigation criteria is met. It should be understood that the embodiments described herein with respect to FIGS. 6A-6E can optionally apply to the embodiments of FIG. 6F-6H.

Figure 6F:
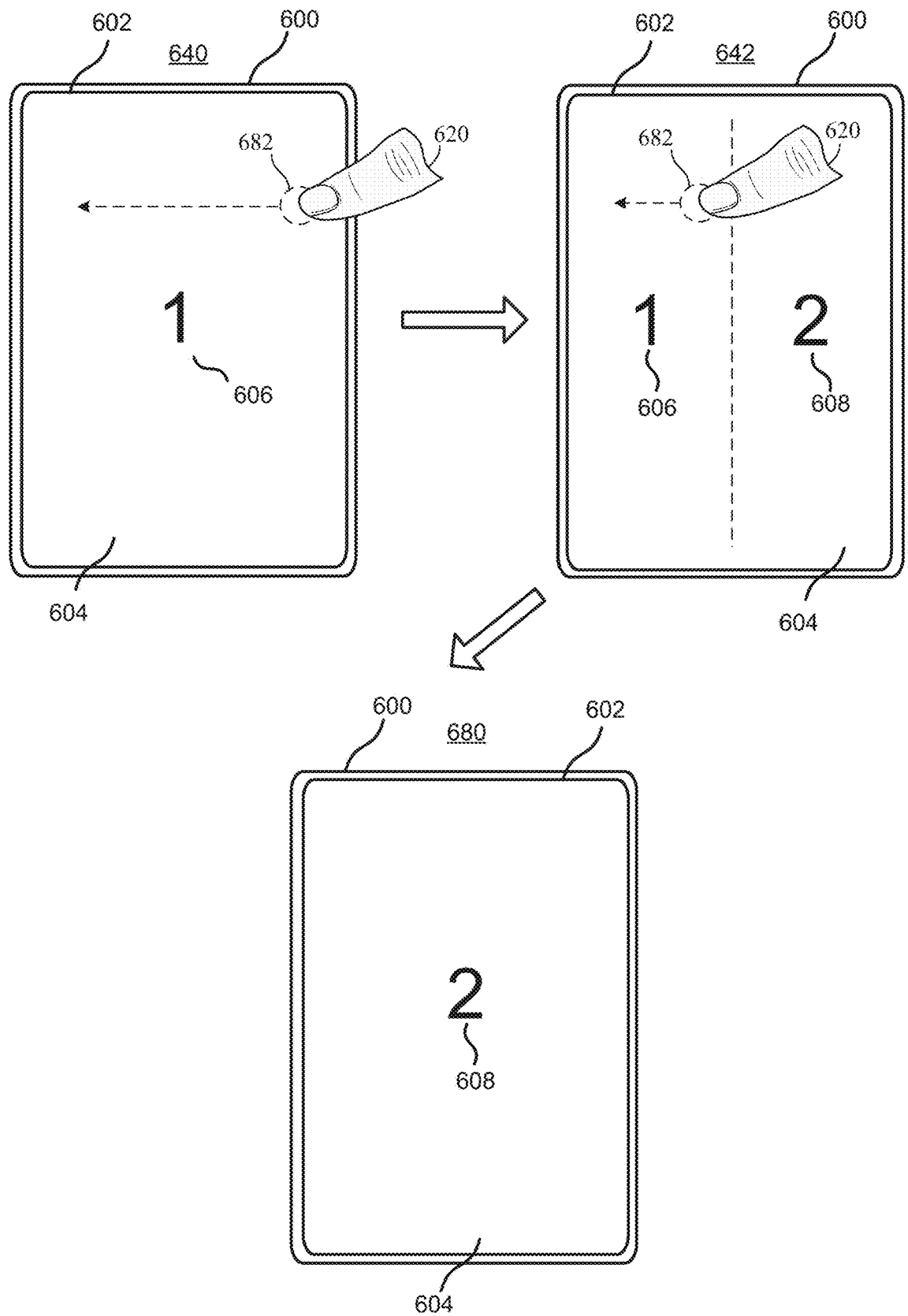
FIG. 6F illustrates example user interfaces for single-view movement between multiple views in accordance with some embodiments.

FIG. 6F illustrates a non-limiting series of user interfaces illustrating navigation between multiple views of a single-view operation. For example, at user interface 640, electronic device 600 displays, on display 602, first view 606. Specifically, electronic device 600 navigates to second view 608 based on a determination that the movement of the contact 682 (e.g., corresponding to user finger 620) meets single-view navigation criteria. For example, as the user moves user finger 620 across touch-sensitive surface 604 while display 602 displays first view 606 at user interface 640, electronic device 600 prepares to perform a view navigation operation based on the view navigation criteria described herein (e.g., single-view navigation criteria).

Further, at user interface 642, electronic device 600 displays first view 608 and second view 608 adjacent the first view 606. At user interface 642, electronic device 600 determines that single-view navigation criteria is met, and displays, on display 602, a representation including first view 606 and second view 608. Upon liftoff of the contact 682 (e.g., corresponding to user finger 620) from touch-sensitive surface 604, electronic device 600 navigates forward to, and displays the second view 608.

Figure 6G:
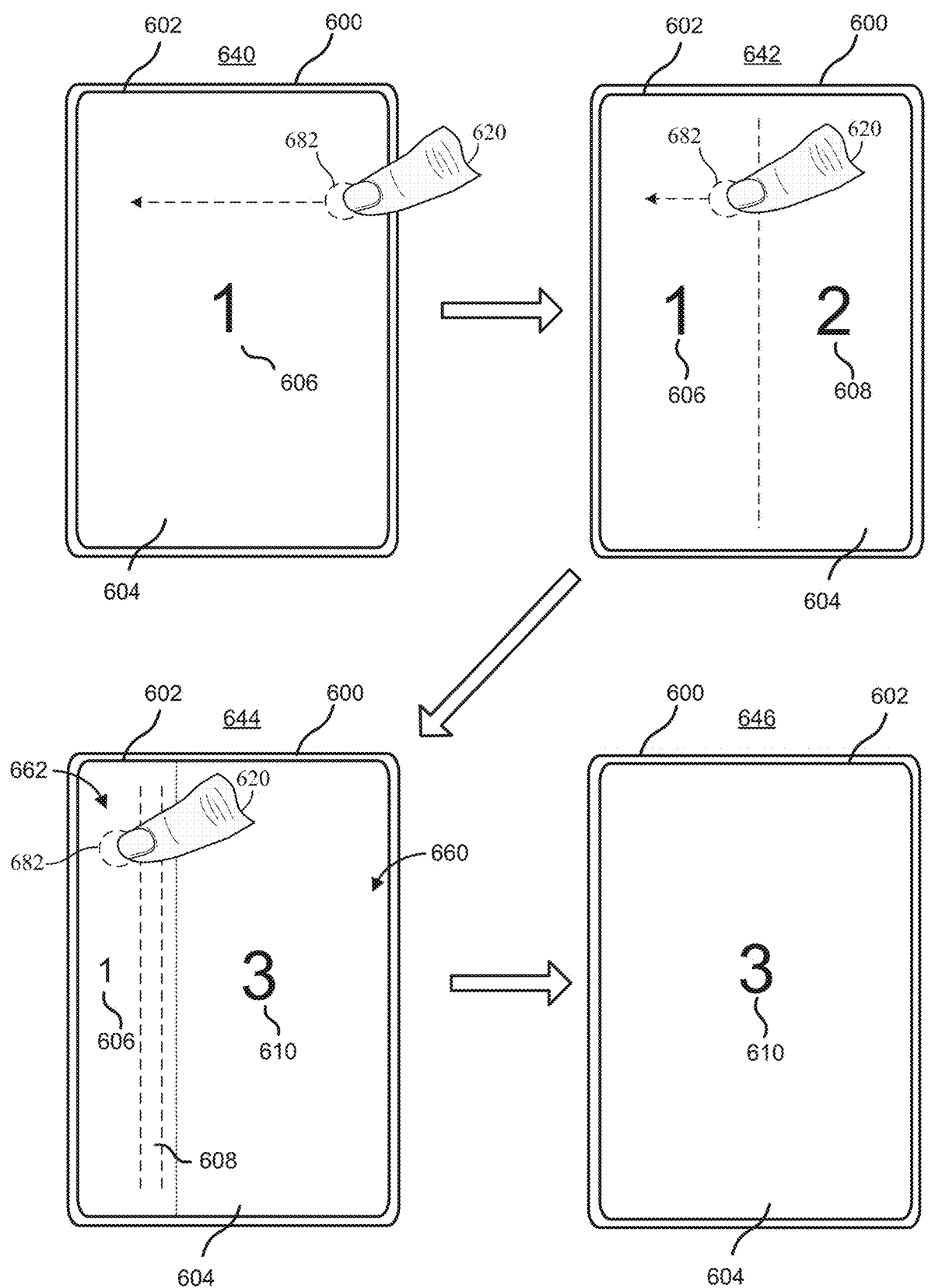
FIG. 6G illustrates example user interfaces for forward movement between multiple views in accordance with some embodiments.

FIG. 6G illustrates example user interfaces for movement between multiple views in accordance with some embodiments, for example, the embodiments described with respect to the preparation of performing a multi-view navigation operation, which corresponds to navigation from first view 606 to third view 610 in FIG. 6B. In some embodiments, the movement or navigation illustrated and described in FIG. 6G is referred to as forward movement or navigation in a sequence of views, where the third view 610 succeeds the first view 606 by one or more views.

Specifically, electronic device 600 navigates to third view 610 based on a determination that the movement of the contact 682 (e.g., corresponding to user finger 620) meets multi-view navigation criteria. For example, as the user moves user finger 620 across touch-sensitive surface 604 while display 602 displays first view 606 at user interface 640, electronic device 600 prepares to perform a view navigation operation based on the view navigation criteria described herein (e.g., single-view navigation criteria and multi-view navigation criteria).

Further, at user interface 642, electronic device 600 displays first view 608 and second view 608 adjacent the first view 606. At user interface 644, electronic device 600 determines that multi-view navigation criteria is met, and displays, on display 602, a stacked view representation including first view 606 and second view 608. In such example, the third view 610 succeeds the first view 606 in the sequence of views. Upon liftoff of the contact 682 (e.g., corresponding to user finger 620) from touch-sensitive surface 604, electronic device 600 navigates forward to, and displays the third view 610.

Figure 6H:
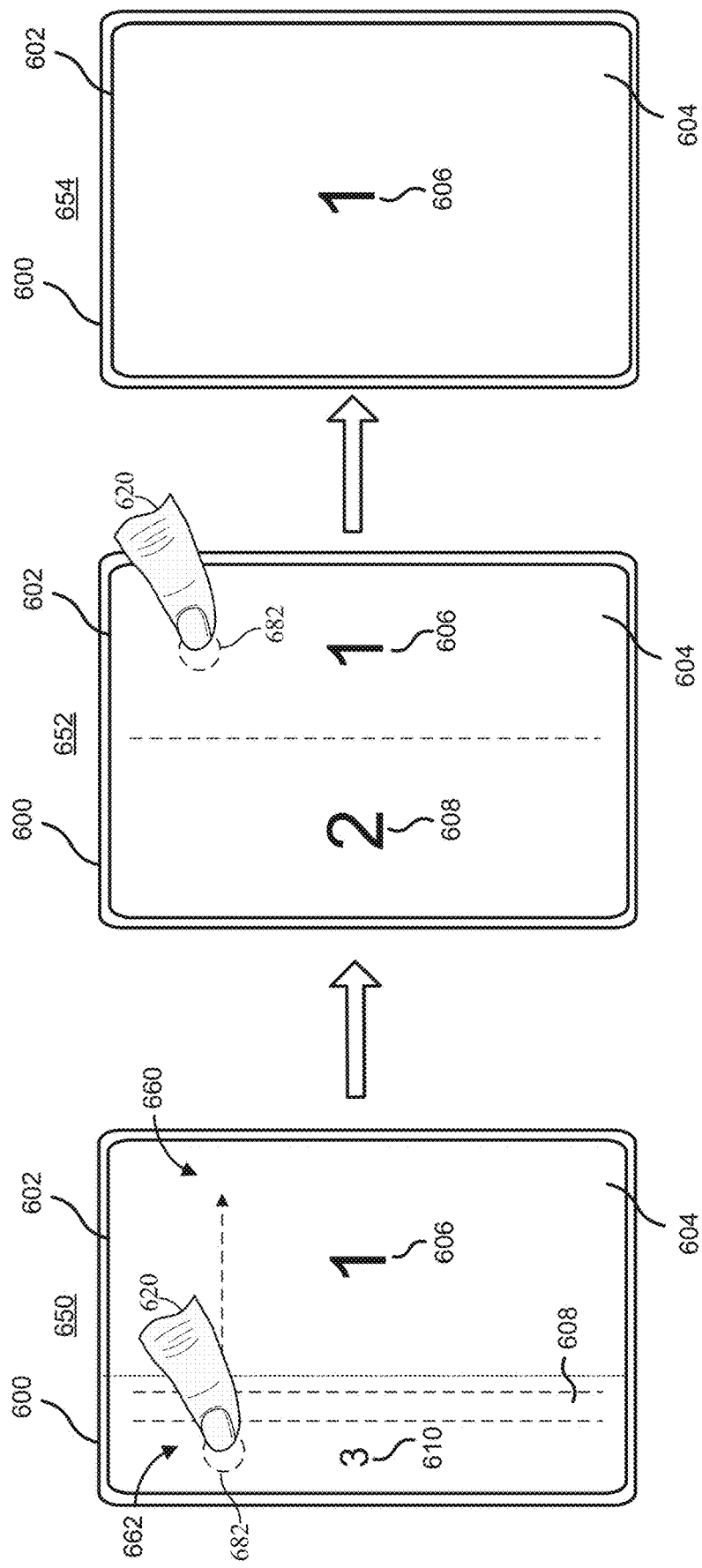
FIG. 6H illustrates example user interfaces for disengaging the preparation of forward movement between multiple views in accordance with some embodiments.

FIG. 6H illustrates example user interfaces for disengaging the preparation of movement between multiple views in accordance with some embodiments. Specifically, electronic device 600 ceases display of the stacked view representation including second view 608 and third view 610 at user interface 630 based on, for example, movement of the content (e.g., corresponding to user finger 620) out of the second region 662 and into the first region 660. For example, at user interface 650, a stacked view representation is displayed on display 602. At user interface 652, electronic device 600 ceases display of the stacked view representation based on a determination that single-view navigation criteria is met. Further, electronic device 600 displays second view 608 in response to detecting a liftoff of contact 682 (e.g., corresponding to user finger 620) from touch-sensitive surface 604. Otherwise, electronic device 600 displays first view 606 when neither single-view navigation criteria nor multi-view navigation criteria is met.

Figure 6I:
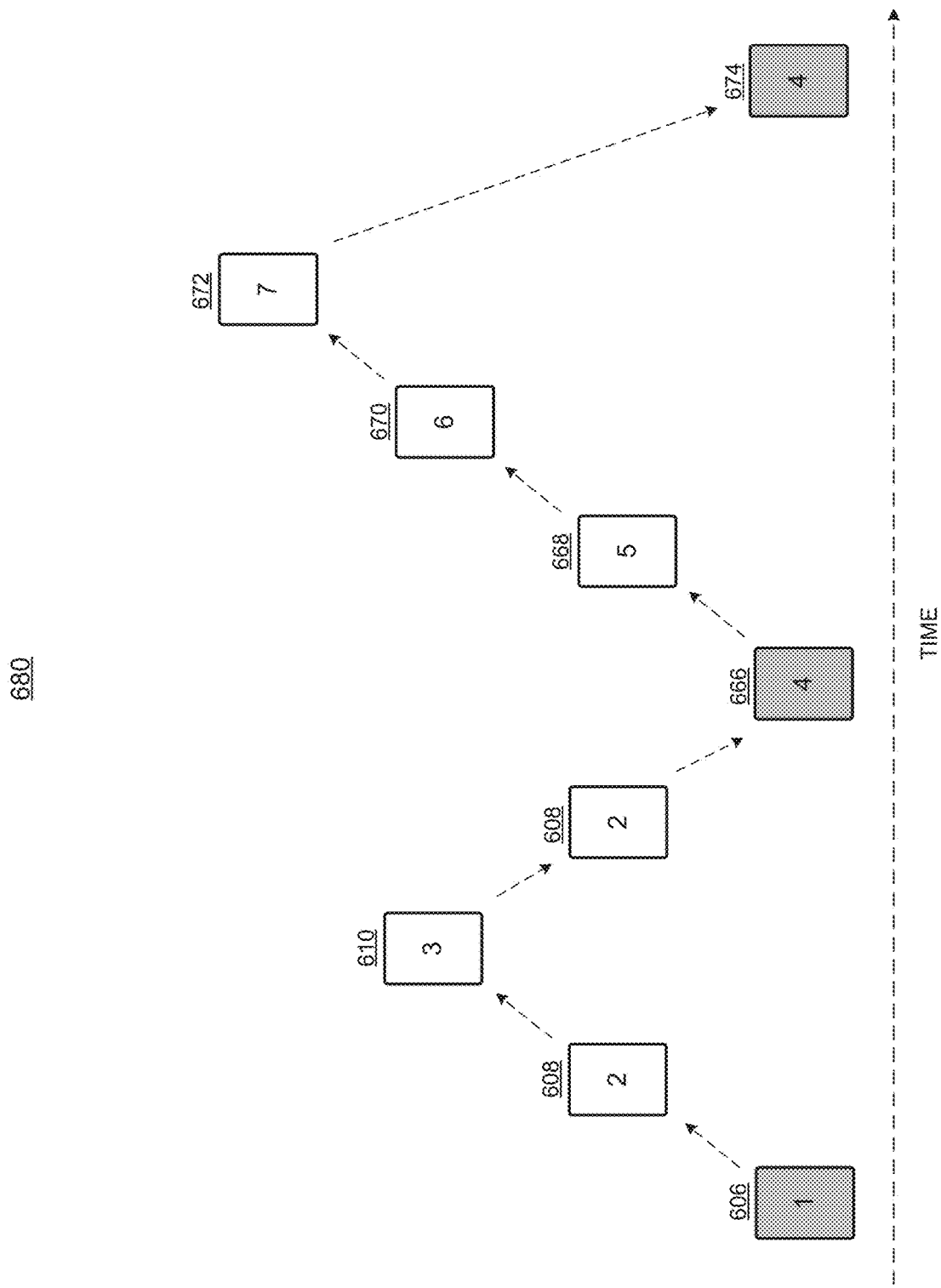
FIG. 6I is a chart diagram illustrating a history of movement between views in accordance with some embodiments.

FIG. 6I is a chart diagram 680 illustrating a history and/or pattern of movement between views in accordance with some embodiments. Chart 680 includes a history axis and a time axis. Further, chart 680 displays a plot of view movement through time at electronic device 600. In some embodiments, the views are associated with one or more application processes. In other words, the views are associated with or correspond to a single application process (e.g., news reader application process), or is associated with or correspond to two or more application process (e.g., news reader application process and web browser application process).

As shown in FIG. 6I, as a user navigates from one view to another view, electronic device 600 records or stores a history of the view movement. For example, the electronic device 600 navigates, in response to user input, from a first view 606 to a second view, and subsequently to a third view 610. Electronic device 600 then returns to second view 608 from third view 610. In some embodiments, first view 606 is identified as, or determined to be anchor view, which is a view to which electronic device 600 navigates to upon determining that multi-view navigation criteria is met.

Further, chart 680 includes a movement from second view 608 to fourth view 666, which can optionally be a view not associated with the first sequence of views including the first view 606, second view 608, and third view 610. That is, in one example, fourth view 666 is associated with an application process different from the first sequence of views. In some embodiments, the fourth view is associated with a different domain name within a web browser application process. In some embodiment, fourth view 666 is associated with a different chapter from the first sequence of views in a book reader application process. As such, fourth view 666 is part of a second sequence of views. Additionally, as evidenced from FIG. 6I, fourth view 666 is identified as, or determined to be the anchor view for the second sequence of views. The second sequence of views includes fifth view 668, sixth view 670, seventh view 672, and eighth view 674. The foregoing pattern or history of view movement is stored at or remote from electronic device 600.

The history is then be analyzed to determine, among other analytical outputs, a view separation value. Specifically, electronic device 600 determines a view separation value indicative of or corresponding to a number of views between or separating the first view 606 and the third view 610. That is, upon or in conjunction with a determination of multi-view navigation criteria, electronic device 600 determines a number of views separating a current view (e.g., the view currently displayed on display 602 and/or the view displayed while movement of contact 682 is detected) and another view. Accordingly, electronic device 600 navigates from one view (e.g., first view 606) to another view (e.g., third view 610) that is separated from the one view (e.g., first view 606) by a number of views in the sequence of view that is equal to the view separation value.

In some embodiments, electronic device 600 determines the view separation value based on the period time the contact 682 has remained on a view, or in the second region of the touch-sensitive surface 604. For example, the view navigation operation includes navigating from the third view 610 to the first view 606 that is separated from the first view 606 by a number of views in the sequence of views that is equal to the view separation value. In some embodiments, the third view 610 is separated from the first view 606 by a predetermined number of views in the sequence of views.

In some embodiments, electronic device 600 determines view separation value and/or the anchor view based on one or more criteria. In one example, electronic device 600 determines the view separation value and/or the anchor view based on a view time parameter. For example, the view time parameter is an amount of time at a particular view. In such example, a view time of the first view 606 is greater than a view time of all other views in the first sequence of views (e.g., second view 608 and third view 610).

Further, electronic device 600 determines the view separation value and/or the anchor view based on the pattern of view movement. For instance, electronic device 600 records a number of times a view has been displayed on display 602 to determine a movement pattern. In such example, if a user is to navigate to a particular view (e.g. first view 606) more often relative to other view (e.g., second view 608 and third view 610), electronic device 600 identifies or otherwise indicates the first view 606 as an anchor view.

In some embodiments, electronic device 600 determines view separation value and/or the anchor view based on an application process category. For instance, each view in a sequence of views is associated with an application process. In some embodiments, electronic device 600 determines view separation value and/or the anchor view based on a view history. For example, the view history (as shown on chart 680) is stored and analyzed to determine patterns, which uses a longer timeframe than the pattern of view movement criteria. Further, electronic device 600 uses one or more of the foregoing criteria to determine the view separation value and/or the anchor view.

Further, the third view 610 is separated from the first view 606 by a percentage of views in the sequence of views. In some embodiments, the percentage of views is a predetermined number based on any one of the view time parameter, the pattern of view movement, the application process category, and/or the view history. In some embodiments, the percentage of views is initially a default value and is updated dynamically based on movement patterns and/or history of the user.

In accordance with some embodiments, chart 680 demonstrates a node structure with respect to the sequences (e.g., first sequence of views and second sequence of views). In some embodiments, the sequence of views includes part of a hierarchy of views, where the hierarchy of views includes one or more nodes. For instance, the sequence of views (e.g., first sequence of views) is a sequence of views within a branching hierarchy of views having one or more nodes corresponding to points at which the hierarchy branches. In some embodiments, one or more additional sequences of views of the hierarchy intersect the first sequence of views at a node. As such, in some embodiments, the hierarchy of views includes two or more sequence of views.

Chart 680 includes at least a first sequence of views including first view 606, second view 608, and third view 610. Chart 680 also includes second sequence of views including fourth view 666, fifth view 668, sixth view 670, and seventh view 672. As such, the hierarchy of views includes the first sequence and the second sequence. In some embodiments, any one of the views in FIG. 6G can optionally be a node in the hierarchy of views. For example, first view 606 is the first node and the fourth view 666 is the second node. In such example, electronic device 600 moves from a view in a sequence of views to a node within the sequence. In some embodiments, electronic device 600 moves from one node to another node.

FIG. 7 is a flow diagram illustrating a method of movement between multiple views using an electronic device and in accordance with some embodiments. Method 700 can optionally be performed at a device (e.g., 100, 300, and/or 500) with a display. Some operations in method 700 can optionally be combined, the order of some operations can optionally be changed, and some operations can optionally be omitted.

As described below, method 700 provides an intuitive way for readily moving between multiple views or pages. The method reduces the cognitive and/or physical burden on a user during such movement, thereby creating a more efficient human-machine interface. For battery-operated computing devices, enabling a user to move between multiple views faster and more efficiently conserves power and increases the time between battery charges.

At block 702, method 700 displays, on the display (e.g., display 602, FIG. 6), a first view in a sequence of views. At block 704, method 700, while displaying the first view (e.g., first view 606, FIG. 6), receives an input corresponding to a movement of a contact (e.g., contact 682, FIG. 6) on the touch-sensitive surface (e.g., touch-sensitive surface 604, FIG. 6) from a first position to a second position. At block 706, method 700, while continuing to detect the contact on the touch-sensitive surface, and in response to receiving the input, prepares to perform a view navigation operation.

At block 708, method 700 determines whether the movement of the contact meets single-view navigation criteria or multi-view navigation criteria. At block 710, method 700 includes, in accordance with a determination that the movement of the contact meets single-view navigation criteria, the view navigation operation includes navigating from the first view to a second view (e.g., second view 608, FIG. 6) that is adjacent to the first view in the sequence of views. At block 712, method 700 includes, in accordance with a determination that the movement of the contact meets multi-view navigation criteria, the view navigation operation includes navigating from the first view to a third view (e.g., third view 610, FIG. 6) that is separated from the first view by one or more views in the sequence of views.

In accordance with some embodiments, method 700 includes, after preparing to perform the view navigation operation, receive a second input corresponding to liftoff of the contact from the touch-sensitive surface; in response to receiving the second input, performing the view navigation operation.

In accordance with some embodiments, the single-view navigation criteria includes determining that the multi-view navigation criteria is not met.

In accordance with some embodiments, the touch-sensitive surface includes a first region (e.g., first region 660, FIG. 6D) and a second region (e.g., second region 662, FIG. 6D) separate from the first region.

In accordance with some embodiments, the single-view navigation criteria includes determining that the first input (e.g., contact 682, FIGS. 6C-6H) corresponds to movement only in the first region (e.g., first region 660, FIGS. 6C-6H).

In accordance with some embodiments, the single-view navigation criteria includes determining that the first input (e.g., contact 682, FIGS. 6C-6H) corresponds to a swipe from an edge of the touch-sensitive surface (e.g., touch-sensitive surface 604, FIG. 6A-6H) within the first region (e.g., first region 660, FIGS. 6C-6H).

In accordance with some embodiments, the multi-view navigation criteria includes a determination that the first input (e.g., contact 682, FIGS. 6C-6H) corresponds to a swipe that starts in the first region (e.g., first region 660, FIGS. 6C-6H) and transitions into the second region (e.g., second region 662, FIGS. 6C-6H).

In accordance with some embodiments, the multi-view navigation criteria further includes determining that the first input corresponds to a contact (e.g., contact 682, FIGS. 6C-6H) that decelerates within the second region (e.g., second region 662, FIGS. 6C-6H).

In accordance with some embodiments, the contact decelerates by at least a minimum amount within the second region (e.g., second region 662, FIGS. 6C-6H).

In accordance with some embodiments, the multi-view navigation criteria includes a determination that the contact (e.g., contact 682, FIGS. 6C-6H) has remained in the second region (e.g., second region 662, FIGS. 6C-6H) of the touch-sensitive surface (e.g., touch-sensitive surface 604, FIG. 6A-6H) for a period of time meeting or exceeding a time threshold.

In accordance with some embodiments, method 700 determines a view separation value based on the period of time, wherein the view navigation operation includes navigating from the first view (e.g., first view 606, FIG. 6) to a third view (e.g., third view 610, FIG. 6) that is separated from the first view by a number of views in the sequence of views that is equal to the view separation value.

In accordance with some embodiments, the view separation value is determined based on one or more criteria selected from the group consisting of a view time parameter, a pattern of view movement, an application process category, or a view history.

In accordance with some embodiments, the view navigation operation includes navigating from the first view (e.g., first view 606, FIG. 6) to the third view (e.g., third view 610, FIG. 6) that is separated from the first view (e.g., first view 606, FIG. 6) by a number of views in the sequence of view that is equal to the view separation value.

In accordance with some embodiments, the third view (e.g., third view 610, FIG. 6) precedes the first view (e.g., first view 606, FIG. 6) in the sequence of views.

In accordance with some embodiments, the third view (e.g., third view 610, FIG. 6) succeeds the first view (e.g., first view 606, FIG. 6) in the sequence of views.

In accordance with some embodiments, the third view (e.g., third view 610, FIG. 6) is separated from the first view (e.g., first view 606, FIG. 6) by a predetermined number of views in the sequence of views.

In accordance with some embodiments, the third view (e.g., third view 610, FIG. 6) is separated from the first view (e.g., first view 606, FIG. 6) by a percentage of views in the sequence of views.

In accordance with some embodiments, the third view (e.g., third view 610, FIG. 6) is an initial view in the sequence of views.

In accordance with some embodiments, the third view (e.g., third view 610, FIG. 6) is a last view in the sequence of views.

In accordance with some embodiments, the sequence of views comprise part of a hierarchy of views, the hierarchy of views including one or more nodes.

In accordance with some embodiments, the third view (e.g., third view 610, FIG. 6) in the sequence of views is a node in the hierarchy of views.

In accordance with some embodiments, the first view (e.g., first view 606, FIG. 6) is a second node in the hierarchy of views.

In accordance with some embodiments, the third view (e.g., third view 610, FIG. 6) is a nearest node of the hierarchy that precedes the first view (e.g., first view 606, FIG. 6).

In accordance with some embodiments, method 700 includes, further in accordance with a determination that the movement of the contact (e.g., contact 682, FIGS. 6C-6H) meets multi-view navigation criteria, displaying a stacked view representation of a plurality of portions each corresponding to a view of the one or more views separating the first view from the third view, the plurality of portions including: a first portion representing a first view of the one or more views separating the first view from the third view, and a second portion representing a second view of the one or more views separating the first view from the third view, different than the first view of the one or more views separating the first view from the third view.

In accordance with some embodiments, wherein displaying the stacked view representation includes: displaying the first portion of the stacked view representation prior to displaying the second portion of the stacked view representation.

In accordance with some embodiments, the number of portions in the plurality of portions is less than the number of views of the one or more views separating the first view from the third view.

In accordance with some embodiments, wherein the first portion and the second portion of the stacked view representation are displayed at an angle with respect to a vertical axis.

In accordance with some embodiments, method 700 includes, after displaying the stacked view representation, determining whether a stacked view representation deconstruction criteria is met, in accordance with a determination that the stacked view representation deconstruction criteria is met, ceasing to display the stacked view representation.

In accordance with some embodiments, wherein ceasing to display the stacked view representation comprises ceasing to display the second portion of the stacked view representation prior to ceasing to display the first portion of the stacked view representation.

In accordance with some embodiments, wherein the stacked view representation deconstruction criteria includes: after preparing to perform the view navigation operation, determining that further movement of the contact meets the single-view navigation criteria.

Figure 8:
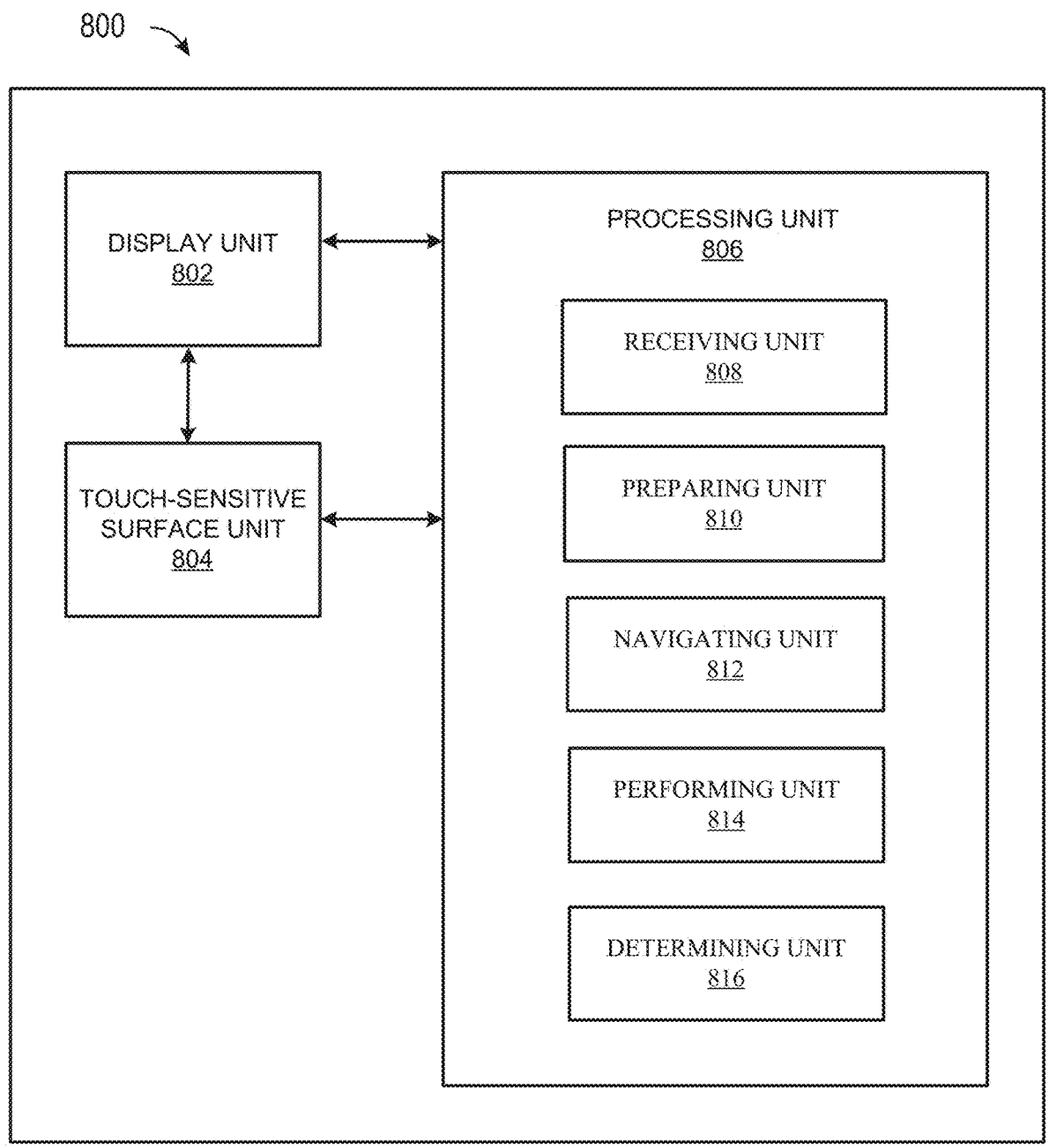
FIG. 8 is a functional block diagram in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802, a touch-sensitive surface unit 804, and a processing unit 806 coupled to the display unit 802 and the touch-sensitive surface unit 804. In some embodiments, the processing unit 806 includes a receiving unit 808, preparing unit 810, navigating unit 812, performing unit 814, and determining unit 816.

The processing unit 806 is configured to: display (e.g., using display unit 802), a first view in a sequence of views; while displaying the first view, receive (e.g., using receiving unit 808) an input corresponding to a movement of a contact on the touch-sensitive surface from a first position to a second position; while continuing to detect the contact on the touch-sensitive surface, and in response to receiving the input, prepare (e.g., using preparing unit 810) to perform a view navigation operation, wherein: in accordance with a determination that the movement of the contact meets single-view navigation criteria, the view navigation operation includes navigating (e.g., using navigating unit 812) from the first view to a second view that is adjacent to the first view in the sequence of views; and in accordance with a determination that the movement of the contact meets multi-view navigation criteria, the view navigation operation includes navigating (e.g., using navigating unit 812) from the first view to a third view that is separated from the first view by one or more views in the sequence of views.

In accordance with some embodiments, processing unit 806 is further configured to, after preparing to perform the view navigation operation, receive a second input corresponding to liftoff of the contact from the touch-sensitive surface; in response to receiving the second input, perform (e.g., using performing unit 814) the view navigation operation.

In accordance with some embodiments, the single-view navigation criteria includes determining that the multi-view navigation criteria is not met.

In accordance with some embodiments, the touch-sensitive surface includes a first region and a second region separate from the first region.

In accordance with some embodiments, the single-view navigation criteria includes determining that the first input corresponds to movement only in the first region.

In accordance with some embodiments, the single-view navigation criteria includes determining that the first input corresponds to a swipe from an edge of the touch-sensitive surface within the first region.

In accordance with some embodiments, the multi-view navigation criteria includes a determination that the first input corresponds to a swipe that starts in the first region and transitions into the second region.

In accordance with some embodiments, the multi-view navigation criteria further includes determining that the first input corresponds to a contact that decelerates within the second region.

In accordance with some embodiments, the contact decelerates by at least a minimum amount within the second region.

In accordance with some embodiments, the multi-view navigation criteria includes a determination that the contact has remained in the second region of the touch-sensitive surface for a period of time meeting or exceeding a time threshold.

In accordance with some embodiments, processing unit 806 is further configured to determine (e.g., using determining unit 816) a view separation value on the period of time, wherein the view navigation operation includes navigating from the first view to a third view that is separated from the first view by a number of views in the sequence of views that is equal to the view separation value.

In accordance with some embodiments, the view separation value is determined based on one or more criteria selected from the group consisting of a view time parameter, a pattern of view movement, an application process category, or a view history.

In accordance with some embodiments, the view navigation operation includes navigating from the first view to the third view that is separated from the first view by a number of views in the sequence of view that is equal to the view separation value.

In accordance with some embodiments, the third view precedes the first view in the sequence of views.

In accordance with some embodiments, the third view succeeds the first view in the sequence of views.

In accordance with some embodiments, the third view is separated from the first view by a predetermined number of views in the sequence of views.

In accordance with some embodiments, the third view is separated from the first view by a percentage of views in the sequence of views.

In accordance with some embodiments, the third view is an initial view in the sequence of views.

In accordance with some embodiments, the third view is a last view in the sequence of views.

In accordance with some embodiments, the sequence of views comprise part of a hierarchy of views, the hierarchy of views including one or more nodes.

In accordance with some embodiments, the third view in the sequence of views is a node in the hierarchy of views.

In accordance with some embodiments, the first view is a second node in the hierarchy of views.

In accordance with some embodiments, the third view is a nearest node of the hierarchy that precedes the first view.

In accordance with some embodiments, processing unit 806 is configured to, further in accordance with a determination that the movement of the contact meets multi-view navigation criteria, display a stacked view representation of a plurality of portions each corresponding to a view of the one or more views separating the first view from the third view, the plurality of portions including: a first portion representing a first view of the one or more views separating the first view from the third view, and a second portion representing a second view of the one or more views separating the first view from the third view, different than the first view of the one or more views separating the first view from the third view.

In accordance with some embodiments, wherein to display the stacked view representation, the processing unit 806 is further configured to display the first portion of the stacked view representation prior to displaying the second portion of the stacked view representation.

In accordance with some embodiments, the number of portions in the plurality of portions is less than the number of views of the one or more views separating the first view from the third view.

In accordance with some embodiments, wherein the first portion and the second portion of the stacked view representation are displayed at an angle with respect to a vertical axis.

In accordance with some embodiments, processing unit 806 is further configured to, after displaying the stacked view representation, determine whether a stacked view representation deconstruction criteria is met, in accordance with a determination that the stacked view representation deconstruction criteria is met, cease (e.g., using display unit 802) to display the stacked view representation.

In accordance with some embodiments, wherein to cease display of the stacked view representation, the processing unit 806 is further configured to cease display of the second portion of the stacked view representation prior to ceasing to display the first portion of the stacked view representation.

In accordance with some embodiments, wherein the stacked view representation deconstruction criteria includes: after preparing to perform the view navigation operation, determine that further movement of the contact meets the single-view navigation criteria.

The operations described above with reference to FIG. 7 are, optionally, implemented by components depicted in FIGS. 1A-1B or FIG. 8. For example, displaying operation 702, receiving operation 704, preparing operation 706, determining operation 708 and navigating operations 710 and/or 712, can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   a touch-sensitive surface;
   one or more processors;
   a memory; and
   one or more programs, wherein the one or more programs are stored in the memory and configured to be executed by the one or more processors, the one or more programs including instructions for:
   display a first view in a sequence of views;
   while displaying the first view, receive a first portion of a gesture input corresponding to a movement of a contact on a touch-sensitive surface from a first position to a second position;
   while continuing to detect the contact on the touch-sensitive surface, and in response to receiving the first portion of the gesture input, display, on the display, a portion of a second view;
   after displaying, on the display, the portion of the second view and while continuing to detect the contact on the touch-sensitive surface, receive a second portion of the gesture input corresponding to a movement of the contact on the touch-sensitive surface from the second position to a third position;
   while continuing to detect the contact on the touch-sensitive surface and in response to receiving the second portion of the gesture input, display, on the display, a portion of a third view;
   after displaying on the display the portion of the third view, detect an end of the gesture input that includes detecting a liftoff of the contact from the touch-sensitive surface; and
   in response to detecting the end of the gesture input that includes detecting liftoff of the contact from the touch-sensitive surface:
   in accordance with a determination that the gesture input meets single-view navigation criteria, perform a view navigation operation that includes navigation to the second view that is adjacent to the first view in the sequence of views; and
   in accordance with a determination that the gesture input meets multi-view navigation criteria, perform a view navigation operation that includes navigation to the third view that is separated from the first view by one or more views in the sequence of views.

2. The electronic device of claim 1, wherein the gesture input is a swipe that starts proximate to an edge of the display.

3. The electronic device of claim 1, wherein the single-view navigation criteria includes a determination that the multi-view navigation criteria is not met.

4. The electronic device of claim 1, wherein the touch-sensitive surface includes a first region and a second region separate from the first region.

5. The electronic device of claim 4, wherein the single-view navigation criteria includes a determination that the end of the gesture input corresponds to liftoff of the contact while the contact is in the first region.

6. The electronic device of claim 4, wherein the single-view navigation criteria includes a determination that the gesture input starts in the first region, transitions into the second region, and ends in the first region.

7. The electronic device of claim 4, wherein the multi-view navigation criteria includes a determination that the end of the gesture input corresponds to liftoff of the contact while the contact is in the second region.

8. The electronic device of claim 4, wherein the multi-view navigation criteria includes a determination that the gesture input corresponds to a swipe that starts in the first region and transitions into the second region.

9. The electronic device of claim 4, wherein the multi-view navigation criteria includes a determination that the gesture input corresponds to a contact that decelerates within the second region.

10. A non-transitory computer-readable storage medium comprising one or more programs for execution by one or more processors of an electronic device with a display and a touch-sensitive surface, the one or more programs including instructions which, when executed by the one or more processors, cause the electronic device to:
   display a first view in a sequence of views;
   while displaying the first view, receive a first portion of a gesture input corresponding to a movement of a contact on a touch-sensitive surface from a first position to a second position;

while continuing to detect the contact on the touch-sensitive surface, and in response to receiving the first portion of the gesture input, display, on the display, a portion of a second view;

after displaying, on the display, the portion of the second view and while continuing to detect the contact on the touch-sensitive surface, receive a second portion of the gesture input corresponding to a movement of the contact on the touch-sensitive surface from the second position to a third position;

while continuing to detect the contact on the touch-sensitive surface and in response to receiving the second portion of the gesture input, display, on the display, a portion of a third view;

after displaying on the display the portion of the third view, detect an end of the gesture input that includes detecting a liftoff of the contact from the touch-sensitive surface; and in response to detecting the end of the gesture input that includes detecting liftoff of the contact from the touch-sensitive surface:

in accordance with a determination that the gesture input meets single-view navigation criteria, perform a view navigation operation that includes navigation to the second view that is adjacent to the first view in the sequence of views; and in accordance with a determination that the gesture input meets multi-view navigation criteria, perform a view navigation operation that includes navigation to the third view that is separated from the first view by one or more views in the sequence of views.

11. The non-transitory computer-readable storage medium of claim 10, wherein the gesture input is a swipe that starts proximate to an edge of the display.

12. The non-transitory computer-readable storage medium of claim 10, wherein the single-view navigation criteria includes a determination that the multi-view navigation criteria is not met.

13. The non-transitory computer-readable storage medium of claim 10, wherein the touch-sensitive surface includes a first region and a second region separate from the first region.

14. The non-transitory computer-readable storage medium of claim 13, wherein the single-view navigation criteria includes a determination that the end of the gesture input corresponds to liftoff of the contact while the contact is in the first region.

15. The non-transitory computer-readable storage medium of claim 13, wherein the single-view navigation criteria includes a determination that the gesture input starts in the first region, transitions into the second region, and ends in the first region.

16. The non-transitory computer-readable storage medium of claim 13, wherein the multi-view navigation criteria includes a determination that the end of the gesture input corresponds to liftoff of the contact while the contact is in the second region.

17. The non-transitory computer-readable storage medium of claim 13, wherein the multi-view navigation criteria includes a determination that the gesture input corresponds to a swipe that starts in the first region and transitions into the second region.

18. The non-transitory computer-readable storage medium of claim 13, wherein the multi-view navigation criteria includes a determination that the gesture input corresponds to a contact that decelerates within the second region.

19. A method, comprising:

at an electronic device with a display and a touch-sensitive surface:

while displaying the first view, receive a first portion of a gesture input corresponding to a movement of a contact on a touch-sensitive surface from a first position to a second position;

while continuing to detect the contact on the touch-sensitive surface, and in response to receiving the first portion of the gesture input, display, on the display, a portion of a second view;

after displaying, on the display, the portion of the second view and while continuing to detect the contact on the touch-sensitive surface, receive a second portion of the gesture input corresponding to a movement of the contact on the touch-sensitive surface from the second position to a third position;

while continuing to detect the contact on the touch-sensitive surface and in response to receiving the second portion of the gesture input, display, on the display, a portion of a third view;

after displaying on the display the portion of the third view, detect an end of the gesture input that includes detecting a liftoff of the contact from the touch-sensitive surface; and in response to detecting the end of the gesture input that includes detecting liftoff of the contact from the touch-sensitive surface:

in accordance with a determination that the gesture input meets single-view navigation criteria, perform a view navigation operation that includes navigation to the second view that is adjacent to the first view in the sequence of views; and in accordance with a determination that the gesture input meets multi-view navigation criteria, perform a view navigation operation that includes navigation to the third view that is separated from the first view by one or more views in the sequence of views.

20. The method of claim 19, wherein the gesture input is a swipe that starts proximate to an edge of the display.

21. The method of claim 19, wherein the single-view navigation criteria includes a determination that the multi-view navigation criteria is not met.

22. The method of claim 19, wherein the touch-sensitive surface includes a first region and a second region separate from the first region.

23. The method of claim 22, wherein the single-view navigation criteria includes a determination that the end of the gesture input corresponds to liftoff of the contact while the contact is in the first region.

24. The method of claim 22, wherein the single-view navigation criteria includes a determination that the gesture input starts in the first region, transitions into the second region, and ends in the first region.

25. The method of claim 22, wherein the multi-view navigation criteria includes a determination that the end of the gesture input corresponds to liftoff of the contact while the contact is in the second region.

26. The method of claim 22, wherein the multi-view navigation criteria includes a determination that the gesture input corresponds to a swipe that starts in the first region and transitions into the second region.

27. The method of claim 22, wherein the multi-view navigation criteria includes a determination that the gesture input corresponds to a contact that decelerates within the second region.

* * * * *